United States Patent
Blanco et al.

(10) Patent No.: US 11,002,827 B2
(45) Date of Patent: May 11, 2021

(54) SYSTEM AND METHOD FOR COLLABORATING BETWEEN VEHICULAR 360 DEGREE THREAT DETECTION APPLIANCES

(71) Applicant: MOTOROLA SOLUTIONS, INC, Chicago, IL (US)

(72) Inventors: Alejandro G Blanco, Charlotte, NC (US); Shervin Sabripour, Plantation, FL (US); Chi T. Tran, Naperville, IL (US); Bert Van Der Zaag, Wheat Ridge, CO (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/417,677

(22) Filed: May 21, 2019

(65) Prior Publication Data
US 2020/0371196 A1   Nov. 26, 2020

(51) Int. Cl.
*G01S 7/00* (2006.01)
*B60Q 5/00* (2006.01)
(Continued)

(52) U.S. Cl.
CPC .............. *G01S 7/003* (2013.01); *B60Q 5/005* (2013.01); *B60Q 9/00* (2013.01); *G01S 13/865* (2013.01); *G01S 13/867* (2013.01)

(58) Field of Classification Search
CPC .......... G01S 7/003; G01S 7/865; G01S 7/867; B60Q 9/00; B60Q 5/005
See application file for complete search history.

(56) References Cited

U.S. PATENT DOCUMENTS 6,967,612 B1 * 11/2005 Gorman .................. G01S 13/34
                                                                 342/22
8,229,663 B2    7/2012 Zeng et al.
(Continued)

OTHER PUBLICATIONS

The International Search Report and the Written Opinion corresponding patent application No. PCT/US2020/029235 filed Apr. 22, 2020, dated Jul. 31, 2020, all pages.

*Primary Examiner* — Adnan Aziz
(74) *Attorney, Agent, or Firm* — Daniel R. Bestor

(57) ABSTRACT

Electronic processing systems and methods for collaborating between vehicular threat detection appliances. One system includes a memory, a transceiver, an electronic processor, and a first vehicular 360-degree threat detection appliance that is physically coupled to a first vehicle. The electronic processor is configured to identify a portion of the first vehicular 360-degree threat detection appliance having an obstructed field-of-view. The electronic processor is also configured to detect a second vehicular 360-degree threat detection appliance that is physically coupled to a second vehicle and has an unobstructed field-of-view of the obstructed field-of-view. The electronic processor is further configured to transmit a request to the second vehicular 360-degree threat detection appliance to provide threat detection coverage for the first vehicle in a direction of the obstructed field-of-view. The electronic processor is also configured to temporarily disable the portion of the first vehicular 360-degree threat detection appliance that has the obstructed field-of-view.

20 Claims, 7 Drawing Sheets

(51) Int. Cl.
*B60Q 9/00* (2006.01)
*G01S 13/86* (2006.01)

(56) References Cited

U.S. PATENT DOCUMENTS

| | | | |
|---|---|---|---|
| 9,437,111 B2* | 9/2016 | Ignaczak | G08G 1/166 |
| 10,131,323 B1* | 11/2018 | Sterling | B60R 25/10 |
| 10,558,224 B1* | 2/2020 | Lin | G08G 1/165 |
| 10,696,272 B2* | 6/2020 | Salter | B60R 25/01 |
| 2010/0198513 A1* | 8/2010 | Zeng | G01S 17/931 |
| | | | 701/300 |
| 2010/0214085 A1 | 8/2010 | Avery et al. | |
| 2012/0182425 A1* | 7/2012 | Higgins-Luthman | |
| | | | B60Q 1/085 |
| | | | 348/148 |
| 2012/0236112 A1* | 9/2012 | Cilia | G06T 7/11 |
| | | | 348/36 |
| 2016/0357187 A1* | 12/2016 | Ansari | G01S 13/862 |
| 2017/0327035 A1* | 11/2017 | Keiser | G08G 1/0133 |
| 2017/0371339 A1 | 12/2017 | Charette et al. | |
| 2018/0045807 A1* | 2/2018 | Senna | G01S 1/024 |
| 2018/0050800 A1* | 2/2018 | Boykin | H04B 7/18506 |
| 2018/0218582 A1 | 8/2018 | Hodge et al. | |
| 2019/0051168 A1 | 2/2019 | Du et al. | |
| 2019/0196481 A1* | 6/2019 | Tay | G01S 17/86 |

\* cited by examiner

SYSTEM AND METHOD FOR COLLABORATING BETWEEN VEHICULAR 360 DEGREE THREAT DETECTION APPLIANCES

BACKGROUND OF THE INVENTION

First responders and other types of users, such as private security personnel, may be under a constant threat of physical harm and safety based on their position and function. This is especially true when the first responder is within or nearby his or her vehicle and has his or her attention focused on other activities, such as writing incident reports, researching case or offender information via personal or vehicular electronic devices, or canvassing an incident scene for clues or evidence. As a result, the first responder may not be alert and may be more likely to inadvertently subject himself or herself to an unsafe situation.

Technologies exist to create virtual perimeters and to detect breaches of those perimeters, such as via video imaging and applied analytic techniques to warn of a breach of such a perimeter. For example, a perimeter may be established surrounding a vehicle and a breach of the perimeter detected by a motion sensing analytic operating on one or more imaging cameras positioned around the vehicle.

However, current technical solutions for vehicular threat detection focus on protecting a single vehicle and do not effectively collaborate with other threat detection systems of nearby vehicles to adapt to the dynamic nature of vehicles and the varying environments vehicles and their occupants may be subjected to. Furthermore, in order to be effective, a threat detection system must avoid false positive notifications and notify the first responder of a threat in a determined right way at a determined right time to avoid the feature from simply being turned off. However, current technical solutions are not dynamic enough to avoid such false positives and tend to over-notify or under-notify in various in-opportune contexts, and are not adaptable to varying electronically detectable events that may occur in and around vehicles.

Thus, there exists a need for an improved technical method, device, and system for collaborating between vehicular threat detection systems of multiple nearby vehicles.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
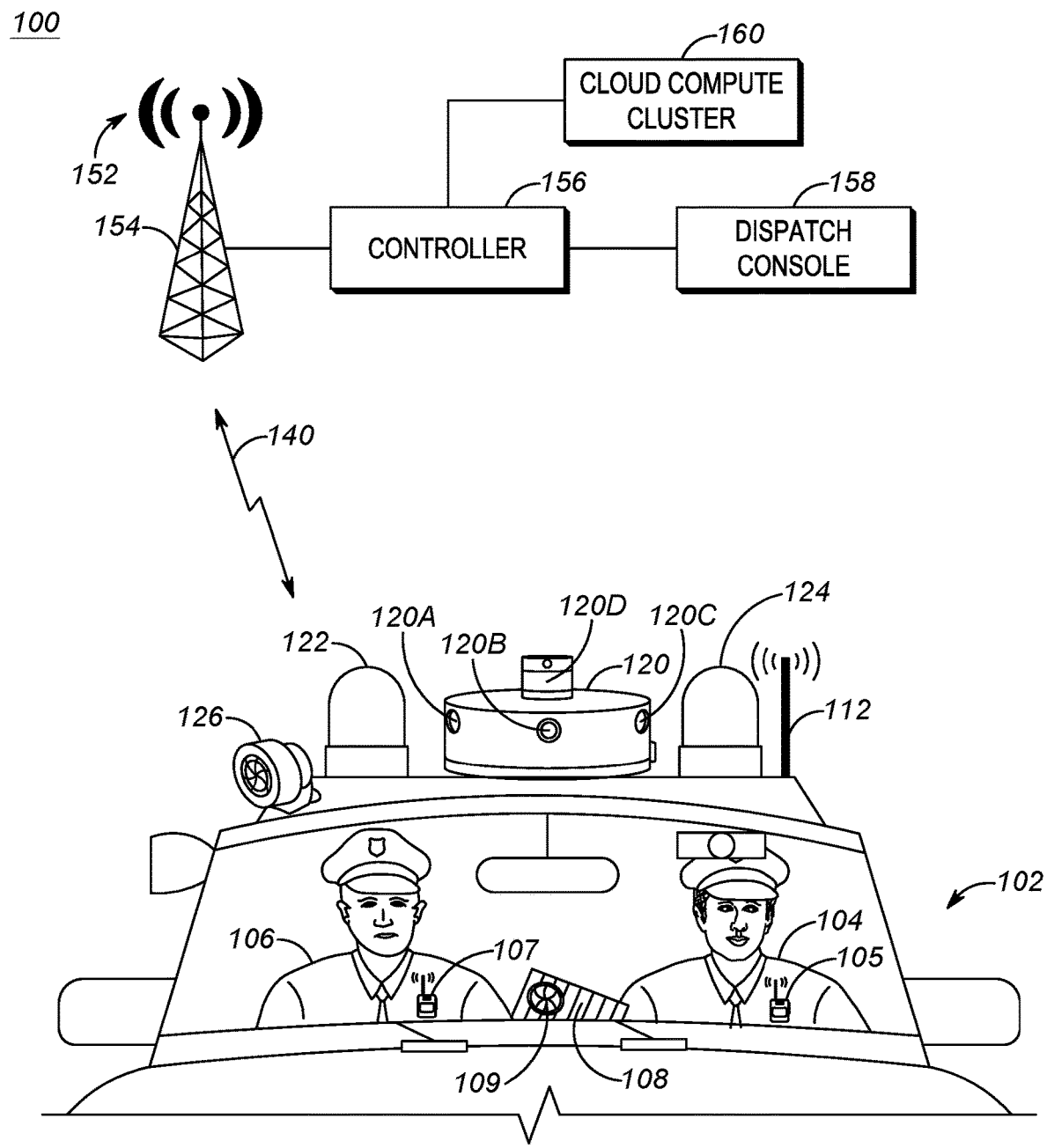
FIG. 1 is a system diagram illustrating an example of an operating environment for collaborating between vehicular 360-degree threat detection appliances, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Disclosed herein is an improved technical method, device, and system for collaborating between vehicular 360-degree threat detection appliances. The disclosed technical solution dynamically collaborates between vehicular 360-degree threat detection appliances of nearby vehicles to provide threat detection beyond obstructions positioned around and between the vehicles. As a result, the threat detection coverage range of each vehicle is increased. In addition, the disclosed technical solution dynamically disables obstructed portions of vehicular 360-degree threat detection appliances. Aside from the power savings that result from dynamically disabling portions of vehicular 360-degree threat detection appliances, the disclosed technical solution mitigates potential interference between vehicular 360-degree threat detection appliances (due to, for example, radar pillar effects, bounce-backs, duplicity, and the like) which, among other things, reduces false positive detections. In addition, the disclosed technical solution dynamically collaborates between vehicular 360-degree threat detection appliances to provide coordinated electronic notifications of detected threats to occupants within the vehicles and exited occupants around the vehicles. As a result, the electronic notifications of detected threats provide occupants with useful information that enables the occupants to react quickly and appropriately. Other technical solutions and corresponding advantages addressing other technical problems are possible as well, including those set forth herein and throughout the remainder of this description.

In one particular embodiment, the disclosure provides an electronic processing system for collaborating between vehicular threat detection appliances. The system includes a memory, a transceiver, an electronic processor, and a first vehicular 360-degree threat detection appliance that is physically coupled to a first vehicle. The electronic processor is configured to identify a portion of the first vehicular 360-degree threat detection appliance having an obstructed field-of-view. The electronic processor is also configured to detect a second vehicular 360-degree threat detection appliance that is physically coupled to a second vehicle and has an unobstructed field-of-view of the obstructed field-of-view. The electronic processor is further configured to transmit, via the transceiver, a request to the second vehicular 360-degree threat detection appliance to provide threat detection coverage for the first vehicle in a direction of the obstructed field-of-view. The electronic processor is also configured to temporarily disable the portion of the first vehicular 360-degree threat detection appliance that has the obstructed field-of-view.

In a further particular embodiment, the disclosure provides a method for collaborating between vehicular 360-degree threat detection appliances. The method includes identifying, with an electronic processor, a portion of a first vehicular 360-degree threat detection appliance that is physically coupled to a first vehicle and has an obstructed field-of-view. The method also includes detecting, with the electronic processor, a second vehicular 360-degree threat detection appliance that is physically coupled to a second vehicle and has an unobstructed field-of-view of the obstructed field-of-view. The method further includes transmitting, via a transceiver communicably coupled to the electronic processor, a request to the second vehicular 360-degree threat detection appliance to provide threat detection coverage for the first vehicle in a direction of the obstructed field-of-view. The method also includes temporarily disabling, via the electronic processor, the portion of the first vehicular 360-degree threat detection appliance that has the obstructed field-of-view.

In another particular embodiment, the disclosure provides an electronic processing system for collaborating between vehicular 360-degree threat detection appliances of adjacently-parked vehicles. The system includes a memory, a transceiver, an electronic processor, and a first vehicular 360-degree threat detection appliance that is physically coupled to a first vehicle. The electronic processor is configured to detect a second vehicle positioned within a threshold distance adjacent the first vehicle. A second vehicular 360-degree threat detection appliance is physically coupled to the second vehicle. The electronic processor is further configured to identify a portion of the first vehicular 360-degree threat detection appliance that has a field-of-view facing the second vehicle. The electronic processor is also configured to transmit, via the transceiver, a request to the second vehicular 360-degree threat detection appliance to provide threat detection coverage for the first vehicle in a direction of the field-of-view facing the second vehicle. The electronic processor is further configured to temporarily disable the portion of the first vehicular 360-degree threat detection appliance having the field-of-view that faces the second vehicle.

Each of the above-mentioned embodiments will be discussed in more detail below, starting with an example communication system and a device architecture of an electronic computing device and system in which the embodiments may be practiced, followed by an illustration of processing blocks for achieving an improved method, device, and system for collaborating between vehicular 360-degree threat detection appliances. Further advantages and features consistent with this disclosure will be set forth in the following detailed description, with reference to the figures.

1. Communication System and Device Architecture a. Communication System Architecture Referring now to the drawings, and in particular FIG. 1, an example communication system diagram illustrates a system 100 including a vehicle 102 and an example wireless infrastructure radio access network (RAN) 152. The vehicle 102 is illustrated with two vehicle occupants including a first officer 104 driver having an associated first personal radio communication device 105 and a second officer 106 passenger having an associated second personal radio communication device 107. The vehicle 102 is equipped with a vehicular computing device 108, an internal speaker 109, an antenna 112 communicatively coupled to a transceiver at the vehicular computing device 108 for communicating with other computing devices in an ad-hoc manner or in an infrastructure manner via the wireless infrastructure RAN 152, a vehicular 360-degree threat detection appliance 120 for capturing a 360-degree field-of-view in an area surrounding the vehicle 102 and for detecting approaching threats, external lights 122 and 124, and an external speaker 126.

The vehicle 102 may be a human-operable vehicle, or may be a partially or fully self-driving vehicle operable under control of the vehicular computing device 108, perhaps in cooperation with the vehicular 360-degree threat detection appliance 120 (which may include one or more of visible-light camera(s), infrared light camera(s), time-of-flight depth camera(s), radio wave emission and detection (such as radio direction and distancing (RADAR) or sound navigation and ranging (SONAR)) device(s), and/or light detection and ranging (LiDAR) device(s) for self-driving purposes and/or for the other purposes as set forth herein). The vehicle 102 may include a location (and/or orientation) determination device integrated with or separately disposed in the vehicular computing device 108 and/or the antenna 112 or associated transceiver for determining (and storing and/or transmitting) a location (and/or orientation) of the vehicle 102. The vehicular computing device 108 may further contain an application (for example, a mapping and routing application) that may provide an input interface (touch, keyboard, voice, wireless transceiver, etc.) for a user such as the first officer 104 or the second officer 106 to enter an intended destination or assigned incident location for the vehicle 102, and after which may provide directions to the first officer 104 or the second officer 106 to move the vehicle 102 to the intended destination or assigned incident location or may control the vehicle 102, perhaps in cooperation with the vehicular 360-degree threat detection appliance 120, to actually move the vehicle 102 to the intended destination or assigned incident location.

The first officer 104 is illustrated in FIG. 1 as an officer (for example, such as a police officer), but in other embodiments, may be any type of vehicle occupant, including one that may drive the vehicle 102 to a particular intended destination or assigned incident location, or may enter an intended destination or assigned incident location into the vehicular computing device 108 prior to physically driving to the intended destination or assigned incident location, and who may be interested in dynamically establishing threat detection perimeter distance(s) at such an intended destination or assigned incident location and being notified of breaches of the dynamically established threat detection perimeter distance(s) in accordance with the disclosure set forth herein.

For example, the first officer 104 may, in other embodiments, work for other governmental and non-governmental agencies such as park districts, real estate offices, or other types of security details. The first officer 104 is also equipped with the first personal radio communication device 105, which may be carried as a hip radio, as an integrated radio-speaker-microphone (RSM) device, or some other device capable of communicating via short-range and/or long-range wireless communication links with the vehicular computing device 108, with each other, and/or with controller 156 via the wireless infrastructure RAN 152, among other possibilities.

The first and second personal radio communication devices 105 and 107 may be any mobile computing device used for infrastructure RAN or direct-mode media (for example, voice, audio, video, etc.) communication via a long-range wireless transmitter and/or transceiver that has a transmitter transmit range on the order of miles (for example, 0.5 to 50 miles, or 3 to 20 miles and in comparison to a short-range transmitter such as a Bluetooth, Zigbee, or NFC transmitter) with other mobile computing devices and/or the wireless infrastructure RAN 152. The long-range transmitter may implement a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoW) application may be implemented. In still further embodiments, the long-range transmitter may implement a Wi-Fi protocol perhaps in accordance with an IEEE 802.11 standard (for example, 802.11a, 802.11b, 802.11g) or a WiMAX protocol perhaps operating in accordance with an IEEE 802.16 standard.

In addition to or as an alternative to the long-range transmitter or transceiver, the first and second personal radio communication devices 105 and 107 may further contain a short-range transmitter or transceiver that has a transmitter transmit range on the order of meters (for example, such as a Bluetooth, Zigbee, or NFC connection having a transmit range on the order of 0.01 to 100 meters, or 0.1 to 10 meters) for communicating with each other or with other computing devices such as vehicular computing device 108. The first and second personal radio communication devices 105 and 107 may further contain one or more physical electronic ports (such as a USB port, an Ethernet port, an audio jack, etc.) for direct electronic coupling with other computing devices such as vehicular computing device 108 or for coupling with other accessories such as a radio speaker microphone (RSM).

The first and second personal radio communication devices 105 and 107 may additionally contain a push to talk (PTT) button that enables transmission of voice audio captured at microphones of the first and second personal radio communication devices 105 and 107 to be transmitted via its short-range or long-range transceiver to other personal radio communication devices or to other computing devices such as dispatch console 158 via the wireless infrastructure RAN 152, and enables reception of voice audio (when not depressed) received at the radio communication device via its long-range or short-range receiver and played back via a speaker of the radio communication device. In those embodiments where the first personal radio communication device 105 is a full-duplex device, instead of a half-duplex device, depression of the PTT button may allow simultaneous transmission and reception of voice audio, instead of mere reception, among other communication media types such as video. The first and second personal radio communication devices 105 and 107 may further include a display screen for displaying images, video, and/or text to the first officer 104 or to someone else. Such a display screen may be, for example, a liquid crystal display (LCD) screen or an organic light emitting display (OLED) display screen. In some embodiments, a touch sensitive input interface may be incorporated into the display screen as well, allowing the first officer 104 to interact with content provided on the display screen. A soft PTT input may also be provided, for example, via such a touch interface. Furthermore, video camera may be provided at the first and second personal radio communication devices 105 and 107 integrating an ability to capture images and/or video and store the captured image data (for further analysis) or transmit the captured image data as an image or video stream to the vehicular computing device 108, to other radio communication devices, and/or to other computing devices via the wireless infrastructure RAN 152.

The first and second personal radio communication devices 105 and 107 may provide an alert notification when a threat is detected based on the data produced by the vehicular 360-degree threat detection appliance 120. In one embodiment, the first personal radio communication device 105 also provides an electronic indication identifying a new stop location for the vehicle 102 that would enable the vehicular 360-degree threat detection appliance 120 physically coupled to the vehicle 102 to monitor an area of interest, for example, by gaining and/or retaining field-of-view of an area of interest that is obstructed by one or more detected physical features (interchangeably referred to as objects).

The vehicular computing device 108 may be any computing device specifically adapted for operation within the vehicle 102, and may include, for example, a vehicular console computing device, a tablet computing device, a laptop computing device, or some other computing device commensurate with the rest of this disclosure and may contain many or all of the same or similar features as set forth above with respect to the first personal radio communication device 105. In some embodiments, the vehicular computing device 108 may form a hub of communication connectivity for one or more of the first and second personal radio communication devices 105 and 107, the vehicular 360-degree threat detection appliance 120, the external lights 122 and 124, the internal speaker 109, the external speaker 126, each of which may be communicatively coupled to the vehicular computing device 108 via one or both of a wired communication link and a short-range wireless communication link. The vehicular computing device 108 may further include or have access to a transceiver and may be coupled to the antenna 112 and through which the vehicular computing device 108 itself and the above-mentioned other devices may further communicate with or be accessed by a long-range wireless communication link with the wireless infrastructure RAN 152, such as via LTE or LMR. The vehicular computing device 108 may similarly provide alert notification about detected threats or alternatively to provide information about the new stop location for the vehicle 102 that would enable the vehicular 360-degree threat detection appliance 120 physically coupled to the vehicle 102 to monitor the area of interest.

The internal speaker 109 is an audio-output device communicatively coupled to the vehicular computing device 108, and perhaps indirectly paired to the first and second personal radio communication devices 105 and 107 for playing back audio such as a public safety tone, series of tones, or spoken words that may then be perceived by occupants within the vehicle 102 such as the first officer 104 or the second office 106. For example, the internal speaker 109 may play spoken words to alert the first officer 104 about approaching threats or alternatively to instruct the first officer 104 to drive the vehicle 102 to a new stop location to enable the vehicular 360-degree threat detection appliance 120 to monitor an area of interest which is obstructed due to one or more objects surrounding the current stop location of the vehicle 102. In some embodiments, the internal speaker 109 may be replaced with a plurality of internal speakers displaced throughout the internal cabin of the vehicle 102 and selectively enabled in accordance with a detected breach of a particularly sized vehicular geofence surrounding the vehicle such that a particular one of the plurality of speakers closest to the breach is selected to playback the tone, spoken notification, or other type of speech output to indicate a relative direction of the approaching threat.

The vehicular 360-degree threat detection appliance 120 includes a communicatively coupled set of one or more distancing sensors that may include one or more capture-only devices and/or one or more emit and capture devices. More specifically, the set of one or more distancing sensors may include one or more of visible-light capture camera(s), infrared capture camera(s), time-of-flight depth camera(s), radio wave distancing device(s), ultrasonic device(s), and/or light detection and ranging (LiDAR) device(s), among other possibilities. In some embodiments, the vehicular 360-degree threat detection appliance 120 is physically coupled to the vehicle 102, such as centrally positioned atop the vehicle 102 as illustrated in FIG. 1. In alternate embodiments, the vehicular 360-degree threat detection appliance 120 is distributed amongst various satellite locations around the vehicle 102 and wiredly or wirelessly coupled to a centralized processing device such as an enclosure same or similar to that illustrated in FIG. 1 as the vehicular 360-degree threat detection appliance 120 or perhaps to the vehicular computing device 108, among other possibilities. When disposed in a distributed fashion, portions of the vehicular 360-degree threat detection appliance 120 may be disposed in other parts of the vehicle 102, such as in the external lights 122 and 124 (which in other embodiments not illustrated may take the form of an elongated light bar positioned atop the vehicle 102), within one or more side or rear view mirrors, integrated into a rear-view camera, or other locations or devices distributed across the internal or external portions of the vehicle 102 and having a view surrounding the vehicle 102.

The vehicular 360-degree threat detection appliance 120 is configured, by itself or in cooperation with the vehicular computing device 108, to detect a breach of a particularly sized vehicular geofence surrounding the vehicle 102. The vehicular 360-degree threat detection appliance 120 may be continuously on and leveraging its distancing sensors to detect a breach of the particularly sized vehicular geofence surrounding the vehicle 102, may only periodically be turned on at a regular or semi-regular cadence to detect whether any breaches of the particularly sized vehicular geofence surrounding the vehicle 102 have occurred, or may be trigged to begin scanning for breaches of the particularly sized vehicular geofence surrounding the vehicle upon occurrence of some other trigger detected at the vehicular 360-degree threat detection appliance 120 or the vehicular computing device 108, or upon receipt of an instruction from, for example, the vehicular computing device 108 or the wireless infrastructure RAN 152, among other possibilities consistent with the remainder of this disclosure.

In some embodiments, the vehicular 360-degree threat detection appliance 120 includes a plurality of distancing sensors, each having a field-of-view less than 360 degrees, which are statically placed around the vehicular 360-degree threat detection appliance 120 or in a distributed manner around the vehicle 102 as set forth earlier. Collectively, the plurality of distancing sensors enable a 360-degree field-of-view of the area surrounding the vehicular 360-degree threat detection appliance 120, and thus the vehicle 102 to which it is attached. For example, the vehicular 360-degree threat detection appliance 120 illustrated in FIG. 1 includes three static visible light imaging devices 120A through 120C each having an approximate 90-degree field-of-view (and further includes a fourth imaging device facing backwards and not illustrated in FIG. 1) that are be combined optically or digitally at the vehicular 360-degree threat detection appliance 120 (or the vehicular computing device 108) to provide visible-light imaging functionality across a 360-degree field-of-view, Alternatively or in addition, the vehicular 360-degree threat detection appliance 120 includes a single distancing device having a field-of-view of less than 360 degrees and that is caused to rotate and scan at a particular frequency. For example, the single distancing sensor may rotate 1 to 10 times or more per second to create a 360-degree field-of-view of the area surrounding the vehicular 360-degree threat detection appliance 120, and thus the vehicle 102 to which it is attached. For example, the vehicular 360-degree threat detection appliance 120 illustrated in FIG. 1 includes an active scanning RADAR emitter and detector 120D (or other radio wave distancing device, although further examples below will use RADAR as the exemplary radio wave distancing device) positioned above the static visible light imaging devices 120A through 120C so as to provide both light-imaging and radio wave reflection range detection capabilities. Other arrangements and combinations are possible as well.

In some embodiments, data produced by the electronic distancing sensors is used at the vehicular 360-degree threat detection appliance 120 and/or the vehicular computing device 108 to determine a range (for example, relative to the vehicle 102) of one or more objects approaching the vehicle 102, perhaps in addition to other characteristics of the approaching object (or some other static or moving object) including but not limited to, a cross-sectional shape, an initial position, a current position, a velocity, an acceleration, a bearing, and/or a size (length, width, and/or height) of the object. The vehicular 360-degree threat detection appliance 120 and/or the vehicular computing device 108 may also then use the characteristics to predict a future location, path, trajectory, or status of the object. Such characteristics may additionally or alternatively be used to classify the object as a person (including type of person such as adult or child), vehicle (including type of vehicle such as car, motorcycle, or airborne drone), animal (including type of animal such as cat or dog), or other type of object. Such characteristics, predictions, and classifications may be stored in a memory at the vehicular 360-degree threat detection appliance 120 and/or the vehicular computing device 108 accompanying or separate from an image, point cloud, or echo map illustrative of the object or objects detected by the electronic ranging devices. The characteristics, predictions, and classifications and/or the image, point cloud, or echo maps may be stored at the vehicular 360-degree threat detection appliance 120 and/or the vehicular computing device 108, and/or may be transmitted to a separate storage or processing device (such as the controller 156, the dispatch console 158, or a cloud computer cluster 160) via the wireless infrastructure RAN 152, among other possibilities.

Each of the electronic ranging devices may have an associated ranging function associated with it for determining an approximate range of a detected object from the vehicular 360-degree threat detection appliance 120, and thus the vehicle 102. For example, for visible light or infrared light imaging devices incorporated into the vehicular 360-degree threat detection appliance 120, pre-configured portions of the captured image frames may be associated with particular distances. For example, a lower quarter of the frame, perhaps identified via pixel count, may be associated with a distance of 5 to 10 meters (or 7 meters) from the vehicle 102, while a second quarter of the frame may be associated with a distance of 10 to 20 meters (or 15 meters) from the vehicle 102, and a remainder of the frame associated with indeterminate distances or above-horizon distances. Such mappings between frame portions and distances may be varied based on parameters such as pan, tilt, zoom settings (if any) of the imaging cameras, a detected orientation of the vehicle 102 and/or the vehicular 360-degree threat detection appliance 120 beyond level, or other detected variations. In still other embodiments, direct mappings may not be used, but instead, analytics applied to capture images that use known or learned sizes of known or learned objects detected in the frame to calculate relative distances from the vehicle 102 or the vehicular 360-degree threat detection appliance 120 to detected objects. For example, other vehicles or other people captured in the frame may be compared to known or average sizes of such objects to then infer a distance in the image to a particular detected object. Other methods of determining a distance to an object in a captured image could be used as well. On the other hand, for emission and detection systems such as LiDAR and RADAR, time of flight information measured from the time of emission to the time of detection, and knowledge/pre-configuration of the speed of such emissions through air, may be used to directly calculate an estimated distance from the vehicle 102 or the vehicular 360-degree threat detection appliance 120 to detected objects.

The external lights 122 and 124 may be any type of externally-perceivable visible light and may include an underlying LED, incandescent, and/or halogen lamp whose light output is constant and unidirectional or which may be modulated into a strobe, directional rotating, blinking, or otherwise non-static and/or focused output, and may comprise a white or colored (for example, red, blue, etc.) light. While the external lights 122 and 124 are depicted in FIG. 1 as separately placed individual lights, in other embodiments, light bars that span substantially the entire width of the roof of the vehicle 102 with a number of same or different sized and/or colored lights in various matrix arrays may be included as well.

The external speaker 126 is a speaker, such as a horn or siren, including an amplifier that broadcasts an externally-perceivable audio output such as a public safety tone, series of tones, or spoken words that may be perceived by exited vehicle occupants, officers, civilians, or suspects nearby while outside of the vehicle 102. In some embodiments, and similar to the internal speaker 109, the external speaker 126 may be replaced with a plurality of speakers displaced throughout the external body of the vehicle 102 and selectively enabled in accordance with a detected breach of the particularly sized vehicular geofence surrounding the vehicle 102 such that a particular one of the plurality of speakers closest to the breach is selected to playback a tone, spoken notification, or other type of speech output to indicate a relative direction of the breach or selectively enabled in accordance with a detected location of officers (such as the first officer 104) located in an area outside of the vehicle 102 such that a particular one of the plurality of speakers closest to the detected location of the officer or officers is selected to playback a tone, spoken notification, or other type of speech output to indicate a breach. In still other embodiments, a physical pan, tilt mechanism may be used to effect directionality of sound emitting from the external speaker 126, while in other embodiments, a plurality of speakers in a matrix configuration may be used to beam steer audio output from the external speaker 126 to a particular location commensurate with the location of the breach or the location of an exited vehicle occupant, officer, civilian, or suspect. Other possibilities exist as well.

Wireless infrastructure RAN 152 may implement over wireless link(s) 140 a narrowband wireless system such as a conventional or trunked LMR standard or protocol, which may include an ETSI DMR, a P25 standard defined by the APCO, TETRA, or other LMR radio protocols or standards. In other embodiments, wireless infrastructure RAN 152 may additionally or alternatively implement over wireless link(s) 140 a broadband wireless system such as an LTE protocol including MBMS, an OMA-PoC standard, a VoIP standard, or a PoIP standard. In still further embodiments, wireless infrastructure RAN 152 may additionally or alternatively implement over wireless link(s) 140 a Wi-Fi protocol perhaps in accordance with an IEEE 802.11 standard (for example, 802.11a, 802.11b, 802.11g) or a WiMAX protocol perhaps operating in accordance with an IEEE 802.16 standard. Other types of wireless protocols could be implemented as well.

The wireless infrastructure RAN 152 is illustrated in FIG. 1 as providing coverage for the vehicle 102 and its occupants via a single fixed terminal 154 coupled to controller 156 (for example, radio controller, call controller, PTT server, zone controller, MME, BSC, MSC, site controller, Push-to-Talk controller, or other network device) and including a dispatch console 158 operated by a dispatcher. In other embodiments, more or different types of fixed terminals may provide RAN services to the vehicle 102 and its vehicle occupants and may or may not contain a separate controller 156 and/or dispatch console 158.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half-duplex mobile devices, but uses mobile devices operating over modern broadband telecommunications networks. Using OMA-PoC, wireless mobile devices such as mobile telephones and notebook computers can function as PTT half-duplex mobile devices for transmitting and receiving. Other types of PTT models and multimedia call models (MMCMs) could be used as well.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (for example, together which form an auditory data stream over time), such as according to RTP and internet protocols (IP), to the PTT server. The PTT server then transmits the auditory data packets to other users of the PoC session (for example, to other mobile devices in the group of mobile devices or talkgroup to which the user is subscribed), using for example, one or more of a unicast, point to multipoint, or broadcast communication technique.

Infrastructure LMR wireless systems, on the other hand, may operate in either a conventional or trunked configuration. In either configuration, a plurality of mobile devices is partitioned into separate groups of mobile devices. In a conventional narrowband radio system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked narrowband radio system and its mobile devices use a pool of traffic channels for virtually an unlimited number of groups of mobile devices (for example, talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (for example, mobile devices) could be provisioned in the network by the user or an agent, and then provided some form of group identity or identifier, for example. Then, at a future time, an originating user in a group may cause some signaling to be transmitted indicating that he or she wishes to establish a communication session (for example, group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

The controller 156 illustrated in FIG. 1, or some other backend electronic computing device existing on-premises or in the cloud computer cluster 160 accessible via an IP network (such as the Internet), may additionally or alternatively operate as a back-end electronic digital assistant, a back-end audio and/or video (or point map or echo map) processing electronic computing device, and/or a remote cloud-based storage device consistent with the remainder of this disclosure.

b. Device Architecture

Figure 2:
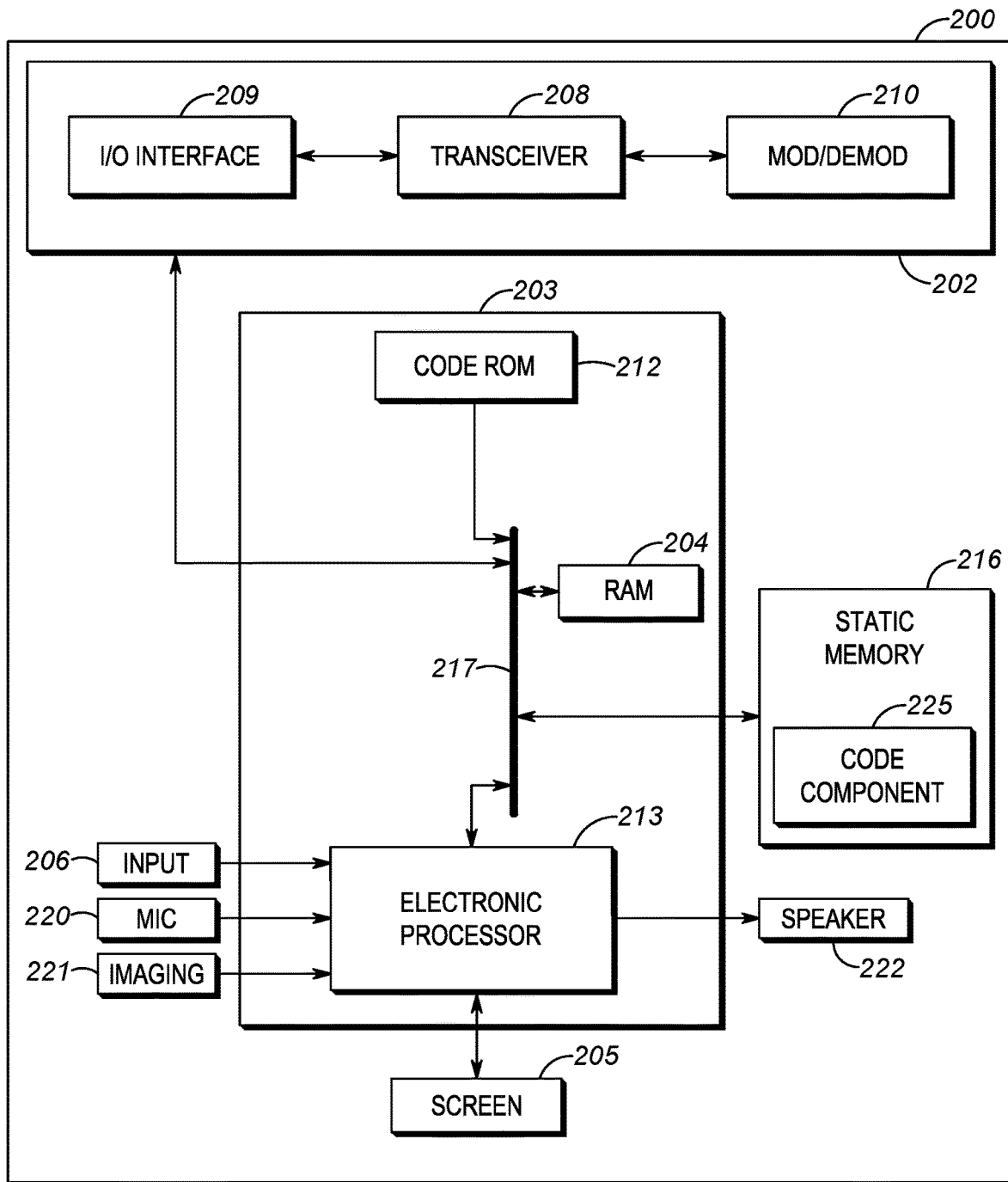
FIG. 2 is a device diagram illustrating an example of an electronic computing device for collaborating between vehicular 360-degree threat detection appliances, in accordance with some embodiments.

Now referring to FIG. 2, a schematic diagram illustrates an electronic computing device 200 according to some embodiments of the present disclosure. The electronic computing device 200 may be, for example, embodied in the first personal radio communication device 105, the second personal radio communication device 107, the vehicular computing device 108, the vehicular 360-degree threat detection appliance 120, the controller 156, the dispatch console 158, one or more computing devices in the cloud computer cluster 160, or some other communication device not illustrated in FIG. 1, and/or may be a distributed communication device across two or more of the foregoing (or multiple of a same type of one of the foregoing) and linked via a wired and/or wireless communication link(s), and may also be referred to herein as an electronic processing system.

The electronic computing device 200 illustrated in FIG. 2 includes a communications unit 202, an electronic processing unit 203, Random Access Memory (RAM) 204, a screen 205, a user interface input 206, a transceiver 208, an input/output (I/O) 209, a combined modulator/demodulator 210, a code Read Only Memory (ROM) 212, an electronic processor 213, a static memory 216, a common data and address bus 217, a microphone 220, an imaging device 221, a speaker, and a code component 225. While FIG. 2 may represent the devices as described above with respect to FIG. 1, depending on the type of the device, the electronic computing device 200 or other devices may include fewer or additional components in configurations different from that illustrated in FIG. 2. For example, in some embodiments, the electronic computing device 200 acting as the controller 156 of FIG. 1 may not include one or more of the screen 205, the microphone 220, the imaging device 221, and the speaker 222. As another example, in some embodiments, the electronic computing device 200 acting as the first personal radio communication device 105 or vehicular computing device 108 of FIG. 1 may further include a location determination device (for example, a global positioning system (GPS) receiver). As still another example, in some embodiments, the electronic computing device 200 acting as the vehicular 360-degree threat detection appliance 120 of FIG. 1 may not include the screen 205, the user interface input 206, the microphone 220, and the speaker 222. Other combinations are possible as well.

As shown in FIG. 2, the communications unit 202 is coupled to the common data and address bus 217 of the electronic processing unit 203. In some embodiments, the user interface input 206 includes a keypad, a pointing device, a touch-sensitive surface, one or more buttons, or a combination thereof. In some embodiments, such as the one illustrated in FIG. 2, the screen 205 is a touch screen display, and thus also acts as an input device. The screen 205, the user interface input 206, the microphone 220, and the imaging device 221 are each coupled to be in communication with the electronic processing unit 203.

The microphone 220 captures audio from a user and/or other environmental or background audio that is further processed by the electronic processing unit 203 in accordance with the remainder of this disclosure and/or is transmitted as voice or audio stream data, or as acoustical environment indications, by the communications unit 202 to other portable radios and/or other communication devices. The imaging device 221 may provide video (still or moving images) or radio echo maps or point cloud maps of an area in a field of view of the electronic computing device 200 for further processing by the electronic processing unit 203 and/or for further transmission by the communications unit 202. The speaker 222 reproduces audio that is decoded from voice or audio streams of calls received via the communications unit 202 from other portable radios, from digital audio stored at the electronic computing device 200, from other ad-hoc or direct mode devices, and/or from the infrastructure RAN device, or may playback alert tones or other types of pre-recorded audio.

The electronic processing unit 203 illustrated in FIG. 2 includes the code ROM 212, which is coupled to the common data and address bus 217 for storing data for initializing system components. The electronic processing unit 203 illustrated in FIG. 2 includes the electronic processor 213 (for example, a microprocessor) coupled, by the common data and address bus 217, to the RAM 204 and the static memory 216.

The I/O interface 209 in the communications unit 202 include one or more wired and/or wireless I/O interface devices that are configurable to communicate with other communication devices, such as the first personal radio communication device 105, the wireless infrastructure RAN 152, and/or the vehicular computing device 108, over which incoming calls may be received and over which communications with remote databases and/or servers may occur.

The transceiver 208 of the communications unit 202 may include one or more wireless transceivers, such as a DMR transceiver, a P25 transceiver, a Bluetooth transceiver, a Wi-Fi transceiver perhaps operating in accordance with an IEEE 802.11 standard (for example, 802.11a, 802.11b, and 802.11g), an LTE transceiver, a WiMAX transceiver perhaps operating in accordance with an IEEE 802.16 standard, another similar type of wireless transceiver configurable to communicate via a wireless radio network, or combination thereof. The transceiver 208 may additionally or alternatively include one or more wireline transceivers, such as an Ethernet transceiver, a USB transceiver, or similar transceiver configurable to communicate via a twisted pair wire, a coaxial cable, a fiber-optic link, or a similar physical connection to a wireline network. The transceiver 208 is coupled to the combined modulator/demodulator 210.

The electronic processor 213 includes ports for coupling to the screen 205, the user interface input 206, the microphone 220, the imaging device 221, the speaker 222, or a combination thereof. The static memory 216 illustrated in FIG. 2 stores the code component 225 (for example, operating code) for the electronic processor 213 that, when executed, performs one or more of the blocks set forth in FIG. 3, FIG. 5, the accompanying texts, or a combination thereof. The static memory 216 may include, for example, a hard-disk drive (HDD), an optical disk drive such as a compact disk (CD) drive or digital versatile disk (DVD) drive, a solid state drive (SSD), a tape drive, a flash memory drive, or a tape drive, and the like.

In examples set forth herein, the electronic computing device 200 is not a generic computing device, but a device specifically configured to implement collaboration between vehicular 360-degree threat detection appliances. For example, in some embodiments, the electronic computing device 200 specifically comprises a computer executable engine configured to implement functionality for collaboration between vehicular 360-degree threat detection appliances of adjacently-parked vehicles.

Figure 3:
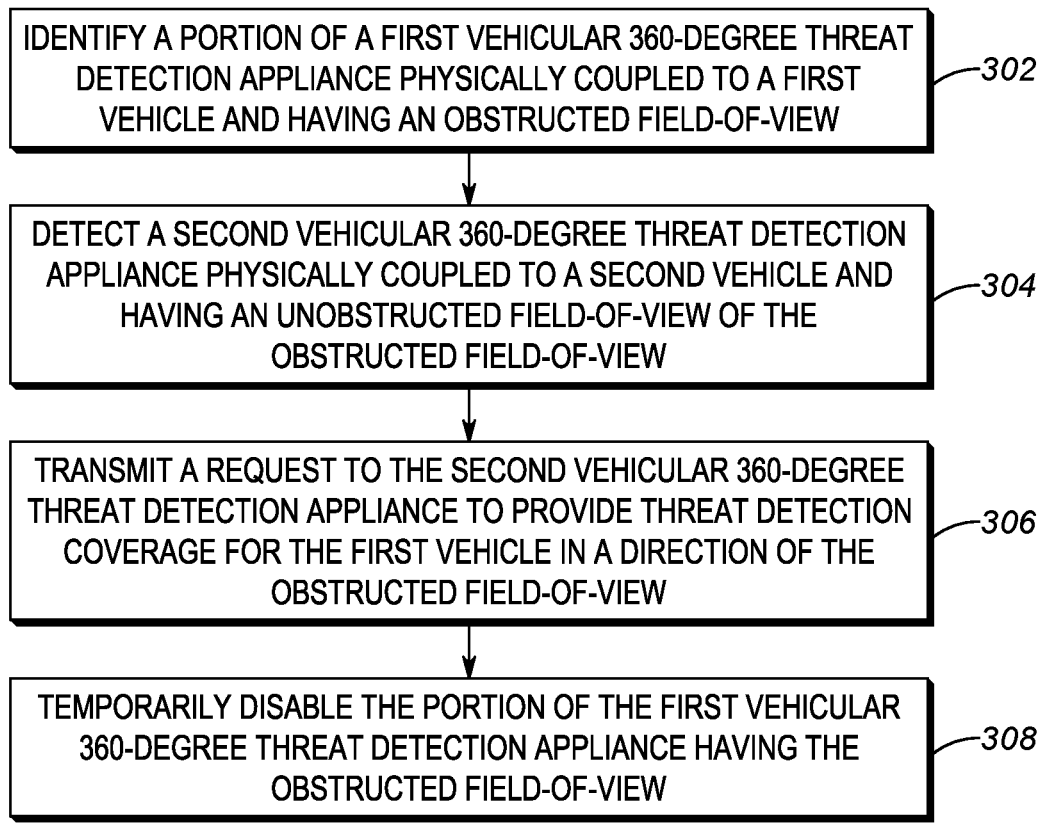
FIG. 3 illustrates a flow chart of a method for collaborating between vehicular 360-degree threat detection appliances, in accordance with some embodiments.
Figure 4A:
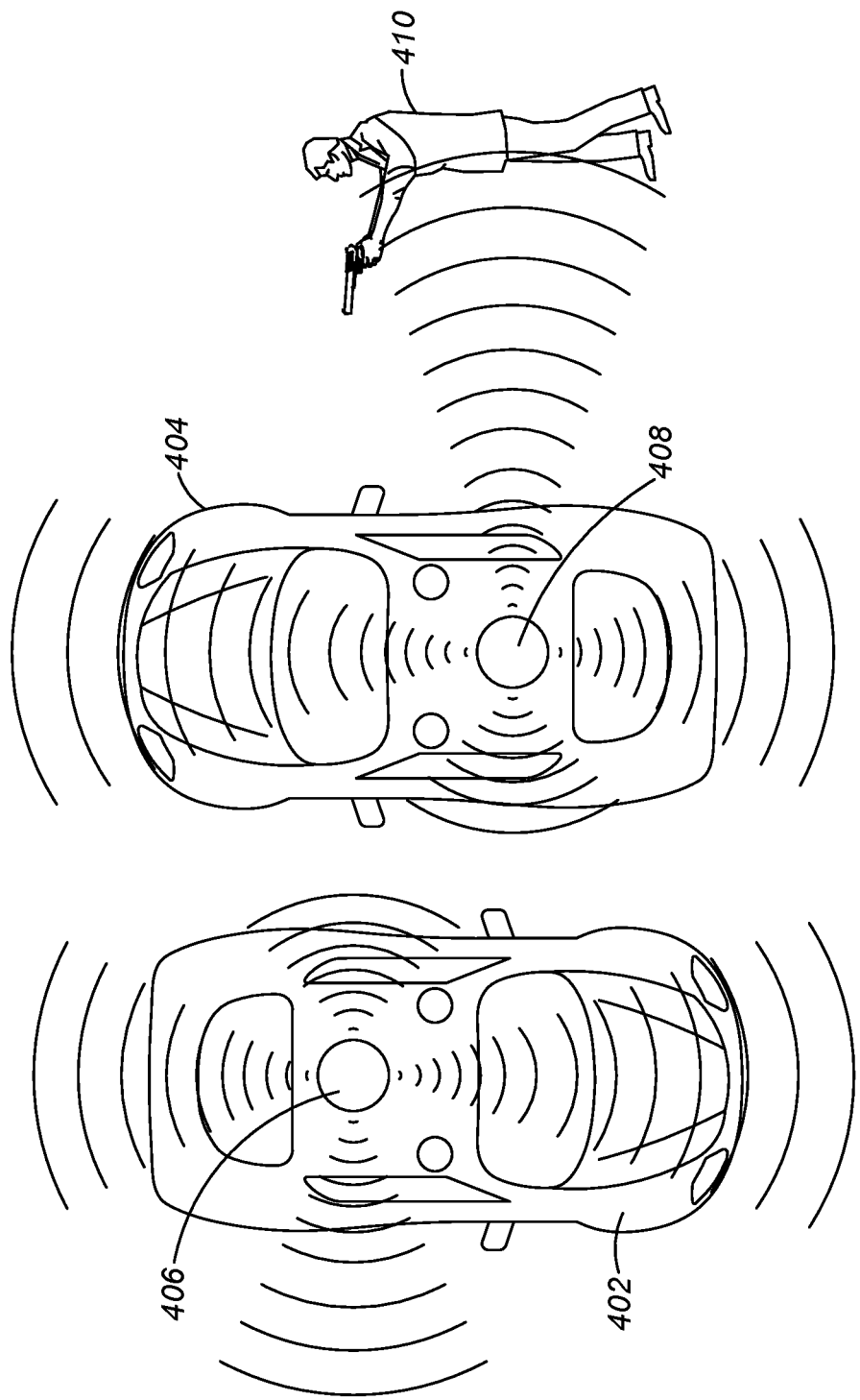
FIG. 4A is a perspective view illustrating an example of collaborating between vehicular 360-degree threat detection appliances of two vehicles parked in a side-by-side configuration, in accordance with some embodiments.
Figure 4B:
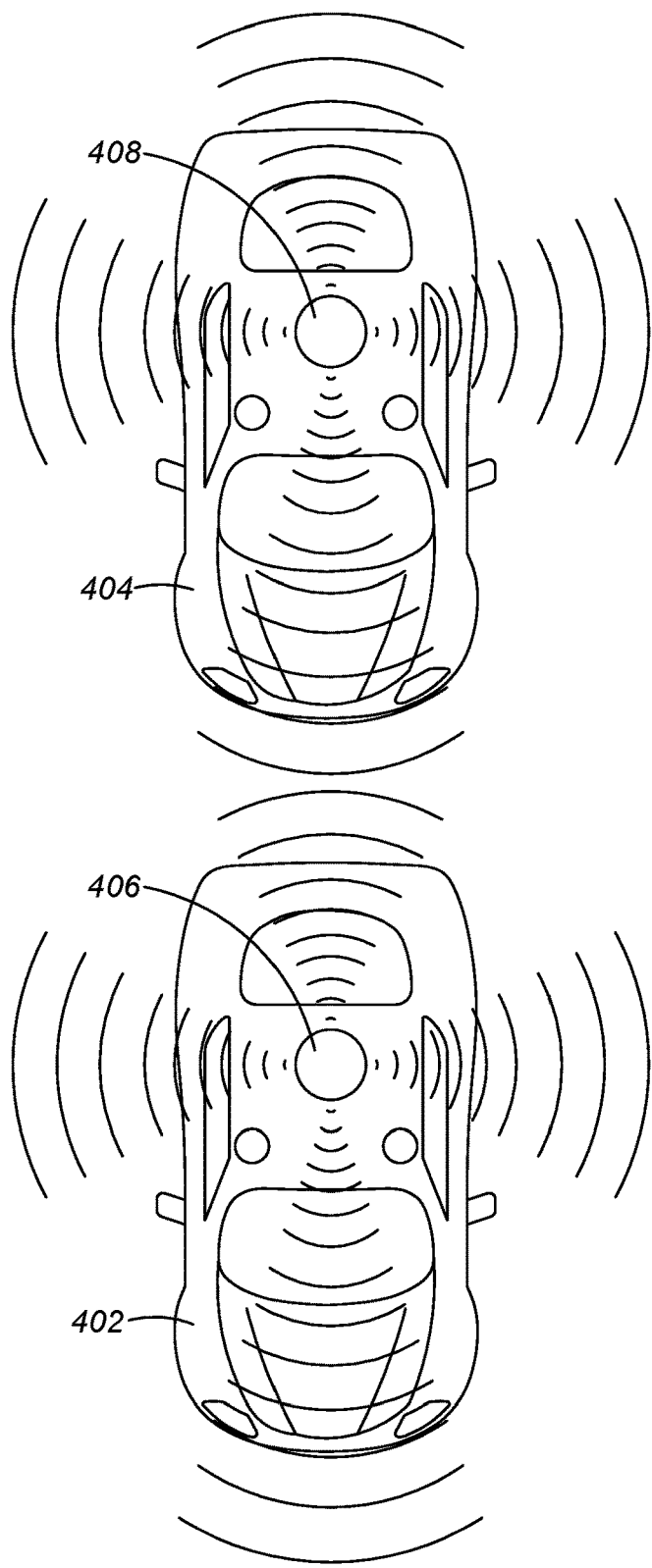
FIG. 4B is a perspective view illustrating an example of collaborating between vehicular 360-degree threat detection appliances of two vehicles parked in a back-to-front configuration, in accordance with some embodiments.
Figure 4C:
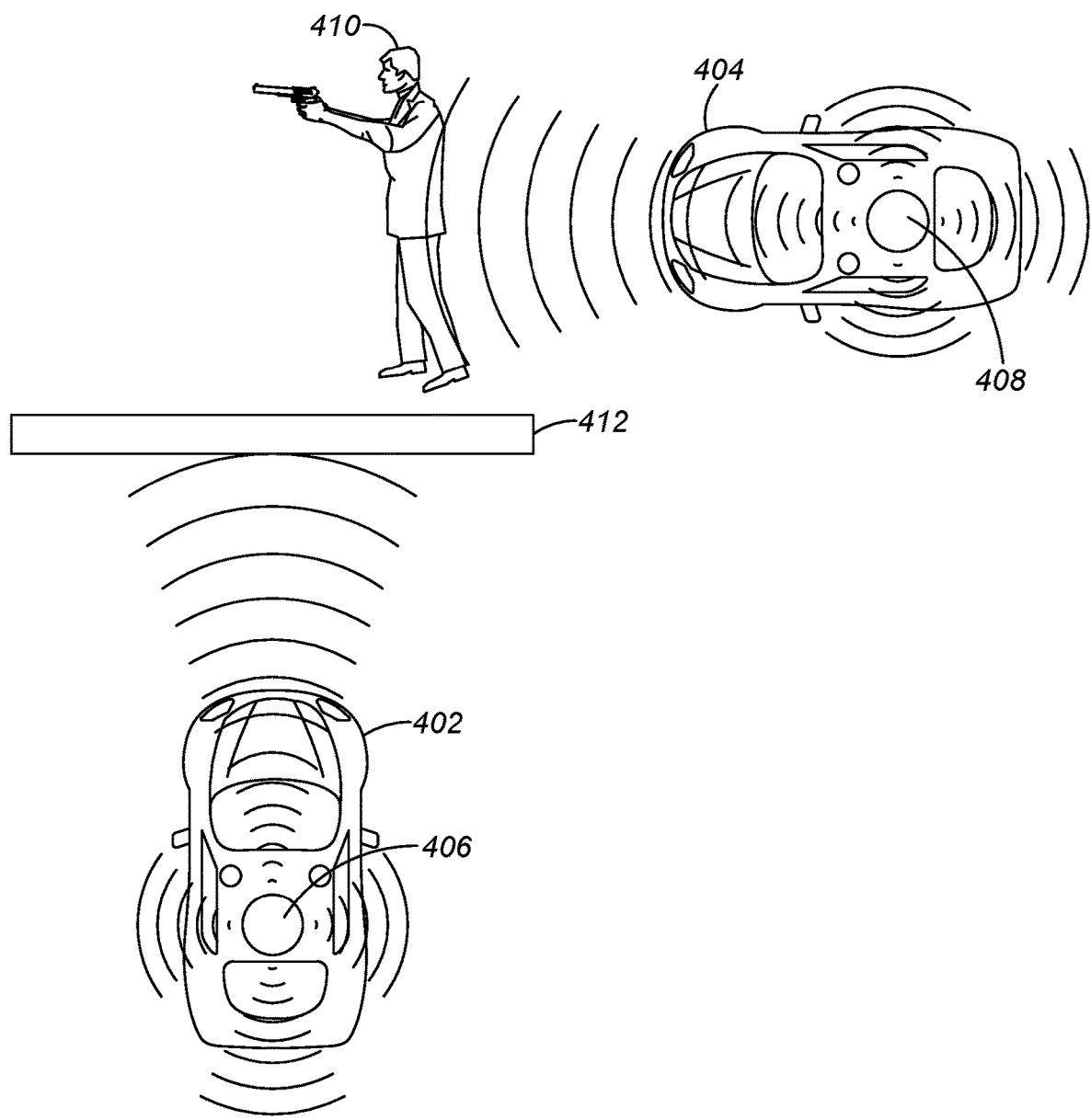
FIG. 4C is a perspective view illustrating an example of collaborating between vehicular 360-degree threat detection appliances of two vehicles to provide threat detection coverage beyond an obstruction, in accordance with some embodiments.

2. Processes for Collaborating Between Vehicular 360-Degree Threat Detection Appliances a. Collaborating Between Two Vehicles Turning now to FIG. 3, a flow chart diagram in FIG. 3 illustrates a process 300 for collaborating between vehicular threat detection appliances. FIGS. 4A through 4C set forth perspective views illustrating various blocks of the process 300 in example scenarios. While a particular order of processing blocks, message receptions, and message transmissions is indicated in FIG. 3 for exemplary purposes, timing and ordering of such blocks, receptions, and transmissions may vary where appropriate without negating the purpose and advantages of the examples set forth in detail throughout the remainder of this disclosure. A corresponding electronic computing device, such as the vehicular computing device 108 of FIG. 1 and/or the electronic computing device 200 of FIG. 2, and embodied as a singular electronic computing device or distributed electronic computing device making up an electronic processing system as set forth earlier, may execute process 300. For ease of description, the process 300 is described below as being substantially performed by the electronic computing device 200 illustrated in FIG. 2.

The process 300 begins at block 302 where the electronic computing device 200 identifies (for example, with the electronic processor 213) a portion of a first vehicular 360-degree threat detection appliance having an obstructed field-of-view. The first vehicular 360-degree threat detection appliance is physically coupled to a first vehicle (for example, the vehicle 102). In some embodiments, the first vehicular 360-degree threat detection appliance includes all or any combination of components included in the vehicular 360-degree threat detection appliance 120 illustrated in FIG. 1 and previously described above. FIGS. 4A through 4C illustrate a few example situations of two police cars 402 and 404 parked near each other. In FIGS. 4A through 4C it is to be assumed that the driver side is the left side of police cars 402 and 404, and that the passenger side is the right side of police car 402 and 404. Vehicular 360-degree threat detection appliance 406 (an example of a "first vehicular 360-degree threat detection appliance") is physically coupled to police car 402 (an example of a "first vehicle"). Vehicular 360-degree threat detection appliance 408 (an example of a "second vehicular 360-degree threat detection appliance") is physically coupled to police car 404 (an example of a "second vehicle"). In FIG. 4A, police cars 402 and 404 are parked adjacent each other in a side-by-side configuration and the field-of-view of a portion of vehicular 360-degree threat detection appliance 406 that extends past the driver side of police car 402 is obstructed by police car 404. Likewise, in the side-by-side configuration illustrated in FIG. 4A, the field-of-view of a portion of vehicular 360-degree threat detection appliance 408 that extends past the driver side of police car 404 is at least partially (or wholly) obstructed by police car 402. In this manner, police car 404 may prevent vehicular 360-degree threat detection appliance 406 of police car 402 from detecting a threat 410 located on the passenger side of police car 404. In FIG. 4B, police cars 402 and 404 are parked adjacent each other in a back-to-front configuration and the field-of-view of a portion of vehicular 360-degree threat detection appliance 406 that extends past the rear side of police car 402 is at least partially (or wholly) obstructed by police car 404. Likewise, in the back-to-back configuration illustrated in FIG. 4B, the field-of-view of a portion of vehicular 360-degree threat detection appliance 408 that extends past the front side of police car 404 is at least partially (or wholly) obstructed by police car 402. In addition, other vehicles and other imaging barriers (for example, walls, trees, fences, hills, and the like) can obstruct one or more portions of a vehicular 360-degree threat detection appliance. For example, in FIG. 4C, the field-of-view of a portion of vehicular 360-degree threat detection appliance 406 that extends past the front side of police car 402 is at least partially (or wholly) obstructed by a wall 412 positioned in front of police car 402. The wall 412 may prevent vehicular 360-degree threat detection appliance 406 from detecting the threat 410 positioned one of the other side of the wall 412.

In some embodiments, the electronic computing device 200 identifies a portion of the first vehicular 360-degree threat detection appliance having an obstructed field-of-view based on data captured by a radio wave distancing system included in some embodiments of the first vehicular 360-degree threat detection appliance. For example, the electronic computing device 200 may receive distancing data from one or more radar sensors indicating the presence and/or positions of objects positioned within the detection range of the first vehicular 360-degree threat detection appliance. Alternatively or in addition, the electronic computing device 200 identifies a portion of the first vehicular 360-degree threat detection appliance having an obstructed field-of-view based on data captured by a light imaging wave distancing system included in some embodiments of the first vehicular 360-degree threat detection appliance. For example, the electronic computing device 200 may receive image data from one or more image sensors of objects positioned within the detection range of the first vehicular 360-degree threat detection appliance. As an additional example, the electronic computing device 200 may receive distancing data from one or more light-based distancing sensors indicating the presence and/or positions of objects positioned within the detection range of the first vehicular 360-degree threat detection appliance.

Next, at block 304, the electronic computing device 200 detects (for example, with the electronic processor 213) a second vehicular 360-degree threat detection appliance physically coupled to a second vehicle and having an unobstructed field-of-view of the obstructed field-of-view. As a first example, with reference to FIG. 4A, vehicular 360-degree threat detection appliance 406 of police car 402 (an example of a "first vehicular 360-degree threat detection appliance") includes a field-of-view extending past the driver side of police car 402 that is obstructed by police car 404. In FIG. 4A, vehicular 360-degree threat detection appliance 408 of police car 404 (an example of a "second vehicular 360-degree threat detection appliance") has an unobstructed field-of-view of the obstructed field-of-view of vehicular 360-degree threat detection appliance 406. As a second example, with reference to FIG. 4C, vehicular 360-degree threat detection appliance 406 of police car 402 includes a field-of-view extending past the front side of police car 402 that is obstructed by wall 412. In FIG. 4C, vehicular 360-degree threat detection appliance 408 of police car 404 has an unobstructed field-of-view behind the wall 412. In some embodiments, the second vehicular 360-degree threat detection appliance includes all or any combination of components included in the vehicular 360-degree threat detection appliance 120 illustrated in FIG. 1 and previously described above.

In some embodiments, the electronic computing device 200 detects that the second vehicular 360-degree threat detection appliance has an unobstructed field-of-view based on the relative position of the second vehicle. For example, the electronic computing device 200 may detect that the second vehicle is positioned relative to the first vehicle such that the second vehicular 360-degree threat detection appliance may provide an unobstructed field-of-view of the obstructed field-of-view of the first vehicular 360-degree threat detection appliance. In some embodiments, the electronic computing device 200 determines the relative position of the second vehicle based on the locations of the first and second vehicles. For example, the electronic computing device 200 may determine and compare GPS locations of the first and second vehicles to determine the relative position of the second vehicle. The electronic computing device 200 may determine the GPS locations of the first and second vehicles in the manner previously described above or in another manner. Alternatively or in addition, the electronic computing device 200 may determine the relative position of the second vehicle based on image data captured by one or more image sensors included in some embodiments of the first vehicular 360-degree threat detection appliance. For example, the electronic computing device 200 may analyze the image data to detect the second vehicle as the second vehicle approaches, and then determines the relative position of the second vehicle when the second vehicle stops moving.

In some embodiments, the electronic computing device 200 communicates with the second vehicular 360-degree threat detection appliance to ensure that the second vehicular 360-degree threat detection appliance has an unobstructed field-of-view of the obstructed field-of-view of the first vehicular 360-degree threat detection appliance. For example, the electronic computing device 200 may transmit (for example, directly or indirectly via an intervening communications infrastructure via the transceiver 208) a request to the second vehicular 360-degree threat detection appliance to check whether the second vehicular 360-degree threat detection appliance has an unobstructed field-of-view in a specified direction. Responsive to receiving the request, the second vehicular 360-degree threat detection appliance may scan in the specified direction to determine whether the second vehicular 360-degree threat detection has an unobstructed field-of-view in the specified direction. When the specified direction is clear, the second vehicular 360-degree threat detection appliance may transmit a response in a same or similar manner to which the request was sent to the electronic computing device 200 (or the first vehicular 360-degree threat detection appliance) indicating that the second vehicular 360-degree threat detection appliance has an unobstructed field-of-view in the specified direction. Alternatively, when the specified direction is not clear, the second vehicular 360-degree threat detection appliance may transmit a response to the electronic computing device 200 indicating that the second vehicular 360-degree threat detection appliance has an obstructed field-of-view in the specified direction. For example, in the exemplary side-by-side configuration illustrated in FIG. 4A, a wall (not shown) may be positioned on the passenger side of police car 404 such that the wall obstructs a field-of-view of vehicular 360-degree threat detection appliance 408 that extends past the passenger side of police car 404. In this situation, vehicular 360-degree threat detection appliance 408 does not have an unobstructed field-of-view in the direction of the obstructed field-of-view of vehicular 360-degree threat detection appliance 406.

Next, at block 306, the electronic computing device 200 transmits (for example, via the transceiver 208) a request to the second vehicular 360-degree threat detection appliance to provide threat detection coverage for the first vehicle in a direction of the obstructed field-of-view. In some embodiments, the transmitted request at block 306 may be replaced with (an example of a "first request") a detection that the second vehicle is positioned within a threshold distance adjacent the first vehicle. Detecting that the second vehicle is positioned within a threshold distance adjacent the first vehicle is described in detail below in relation to block 502 of FIG. 5.

Alternatively or in addition, the request includes information identifying a portion of the second vehicular 360-degree threat detection appliance that the first vehicular 360-degree threat detection appliance is requesting the second vehicular 360-degree threat detection appliance provide threat detection over. For example, the request may include information identifying one or more distancing sensors included in the second vehicular 360-degree threat detection appliance. In some embodiments, the electronic computing device 200 identifies the one or more distancing sensors of the second vehicular 360-degree threat detection appliance based at least in part on the location of the first vehicle, the location of the second vehicle, the orientation of the first vehicle, the orientation of the second vehicle, or a combination thereof. Examples of methods for determining location and orientations of the first and second vehicles are described below in the paragraphs following the next paragraph.

Alternatively or in addition, the request includes information indicating the obstructed field-of-view of the first vehicular 360-degree threat detection appliance. For example, the request may include an absolute bearing direction or bearing range identifying the obstructed field-of-view of the first vehicular 360-degree threat detection appliance. Alternatively or in addition, the request includes information identifying a field-of-view of the second vehicular 360-degree threat detection appliance that the first vehicular 360-degree threat detection appliance is requesting the second vehicular 360-degree threat detection appliance provide threat detection over. For example, the request may include an absolute bearing direction or bearing range identifying a field-of-view of the second vehicular 360-degree threat detection appliance. In some embodiments, responsive to receiving a request indicating a field-of-view (for example, indicating the obstructed field-of-view of the first vehicular 360-degree threat detection appliance), the second vehicular 360-degree threat detection appliance identifies one or more distancing sensors (or portions thereof) of the second vehicular 360-degree threat detection appliance that has the requested field-of-view based on the location of the first vehicle, the location of the second vehicle, the orientation of the first vehicle, the orientation of the second vehicle, or a combination thereof. Examples of methods for determining locations and orientations of the first and second vehicles are described below in the following paragraphs.

In some embodiments, the location of the first vehicle is determined by a global positioning system (GPS) location of the first vehicle. Alternatively or in addition, the location of the first vehicle is determined by image or video analytics operating at a coupled image capture device (such as the one operating at the vehicular 360-degree threat detection appliance 120 of FIG. 1) that may recognize cross-streets or building addresses or business names, that can be associated with a location of the first vehicle. Method similar to those described above, as well as other methods, may be used to determine the position of the second vehicle.

In some embodiments, the electronic computing device 200 determines the orientation of the first vehicle based on an orientation indication received from a magnetometer physically coupled to the first vehicle. Alternatively or in addition, the electronic computing device 200 determines the orientation of the first vehicle based on a plurality of global positioning system (GPS) locations of the first vehicle before the first vehicles comes to a stop. For example, by accessing a plurality of global positioning system (GPS) locations of the first vehicle before the first vehicle comes to a stop, the electronic computing device 200 may infer the orientation of the first vehicle from the plurality of GPS locations. Alternatively or in addition, the electronic computing device 200 determines the orientation of the first vehicle by detecting a surface of the second vehicle based on ranging data determined by the first vehicular 360-degree threat detection appliance. Alternatively or in addition, the electronic computing device 200 determines the orientation of the first vehicle based on video analytics of image data captured by a coupled image capture device (such as the one operating at the vehicular 360-degree threat detection appliance 120 of FIG. 1). Methods similar to those described above, as well as other methods, may be used to determine the orientation of the second vehicle.

Returning to FIG. 3, finally, at block 308, the electronic computing device 200 temporarily disables (for example, with the electronic processor 213) the portion of the first vehicular 360-degree threat detection appliance having the obstructed field-of-view. For example, in FIGS. 4A through 4C, the vehicular 360-degree threat detection appliances 406 and 408 each include four distancing sensors. Each distancing sensor illustrated in FIGS. 4A through 4C is configured to sense within a 90-degree field-of-view on one side of a police car. In FIG. 4A, vehicular 360-degree threat detection appliance 406 may temporarily disable the distancing sensor configured to sense past the driver side of police car 402 as its field-of-view is obstructed by police car 404. In FIG. 4B, vehicular 360-degree threat detection appliance 406 may temporarily disable the distancing sensor configured to sense past the rear side of police car 402 as its field-of-view is obstructed by police car 404. In FIG. 4C, vehicular 360-degree threat detection appliance 406 may temporarily disable the distancing sensor configured to sense past the front side of police car 402 as its field-of-view is obstructed by the wall 412.

In some embodiments, the first vehicular 360-degree threat detection appliance includes a radio wave distancing system, as previously described in detail above. In such embodiments, the electronic computing device 200 may temporarily disable a portion of the radio wave distancing system. For example, in an implementation in which the radio wave distancing system includes four radio wave distancing sensors, the electronic computing device 200 may temporarily disable one of the radio wave distancing sensors that has a field-of-view including the obstructed field-of-view. Alternatively or in addition, the first vehicular 360-degree threat detection appliance includes a light imaging distancing system, as previously described in detail above. In such embodiments, the electronic computing device 200 may temporarily disable a portion of the light imaging distancing system. For example, in an implementation in which the light imaging distancing system includes four light imaging distancing sensors, the electronic computing device 200 may temporarily disable one of the light imaging distancing sensors that has a field-of-view including the obstructed field-of-view. In some embodiments, after disabling a portion of the light imaging distancing system, the electronic computing device 200 may periodically re-enable the disabled portion of the light imaging distancing system for short periods of time to confirm whether the obstructed field-of-view is still obstructed. In some embodiments in which the first vehicular 360-degree threat detection appliance includes both a radio wave distancing system and a light imaging distancing system, the electronic computing device 200 may disable a portion of each of the radio wave distancing system and the light imaging distancing system that has a field-of-view including the obstructed field-of-view. In some other embodiments in which the first vehicular 360-degree threat detection appliance includes both a radio wave distancing system and a light imaging distancing system, the electronic computing device 200 may disable a portion of the radio wave distancing system facing the obstructed field-of-view, but continue to monitor the obstructed field-of-view with a portion of the light imaging distancing system for an indication that the obstructed field-of-view is no longer obstructed. Upon detecting that the obstructed field-of-view is no longer obstructed, the electronic computing device 200 may responsively re-enable the disabled portions of the radio wave distancing system.

b. Coordinated Threat Notifications

In some embodiments, upon detecting a threat with the first vehicular 360-degree threat detection appliance or the second vehicular 360-degree threat detection appliance, the electronic computing device 200 generates audible and/or visual notifications of the threat via one or more target electronic devices. In some embodiments, the target electronic devices include an electronic device associated with an occupant of the first vehicle or the second vehicle. For example, the target electronic devices may include the first personal radio communication device 105 of the first officer 104 and the second personal radio communication device 107 associated with the second officer 106, described above in relation to FIG. 1. Alternatively or in addition, the target electronic devices include electronic devices fixed to the first vehicle or the second vehicle. For example, the target electronic devices may include the internal speaker 109 of the vehicular computing device 108 and the external speaker 126 fixed to the exterior of the vehicle 102. In some embodiments, the electronic computing device 200 identifies one or more target electronic devices to notify of a detected threat based on a location of the detected threat as well as a location of the first vehicle, a location of the second vehicle, an orientation of the first vehicle, an orientation of the second vehicle, or a combination thereof. For example, with reference to FIG. 4A, upon detecting the threat 410 positioned on the passenger side of police car 404, the electronic computing device 200 may determine that an officer sitting in the passenger seat of police car 404 is located closest to the threat 410 based on the location of the threat 410, the location of police car 404, and the orientation of police car 404. Thus, the electronic computing device 200 may notify a personal radio communication device associated with the officer sitting in the passenger seat of police car 404 to provide an audible notification of the threat 410.

In some embodiments, the electronic computing device 200 receives (for example, via the transceiver 218) notifications of threats detected by the first vehicular 360-degree threat detection appliance, the second vehicular 360-degree threat detection appliance, or both. For example, these notifications may indicate threats detected by the second vehicular 360-degree threat detection appliance within the obstructed field-of-view of the first vehicular 360-degree threat detection appliance. Responsive to receiving notifications of detected threats, the electronic computing device 200 may provide audible notifications (for example, with the speaker 222) and/or visual notifications (for example, with the screen 205) to an occupant of the first vehicle and/or the second vehicle indicating the presence of the detected threats. In some embodiments, the audible and/or visual notifications merely indicate the presence of detected threats. In alternate embodiments, the audible and/or visual notifications provide additional information about detected threats. In some embodiments, an audible and/or visual notification may indicate a direction of a detected threat relative to the first vehicle or the second vehicle. For example, when a threat is detected on the passenger side of the first vehicle, the speaker 222 may generate an audible notification of "THREAT AT 9 O'CLOCK!" In some embodiments, a notification of a detected threat indicates a location (for example, a GPS location) of the detected threat. In such embodiments, the electronic computing device 200 may determine a direction of the threat relative to a vehicle based on the location of the vehicle, the orientation of the vehicle, and the location of the threat. For example, the electronic computing device 200 may determine a direction of the threat relative to the first vehicle based on the location of the first vehicle, the orientation of the first vehicle, and the location of the threat. Alternatively or in addition, a notification of a detected threat may indicate a direction of the threat relative to the vehicle whose vehicular 360-degree threat detection appliance detected the threat. In some situations, the direction of the threat relative to the second vehicle is different than the direction of the threat relative to the first vehicle. For example, with reference to FIG. 4A, threat 410 is positioned on the passenger side of police car 404 and on the driver side of police car 402. Thus, upon detecting threat 410, vehicular 360-degree threat detection appliance 408 may send a notification to vehicular 360-degree threat detection appliance 406 indicating that a threat has been detected on the passenger side of police car 404. Thus, in such embodiments, the electronic computing device 200 may determine a direction of the threat relative to the first vehicle based on the location of the first vehicle, the location of the second vehicle, the orientation of the first vehicle, the orientation of the second vehicle, and the direction of the threat relative to the second vehicle. For example, with reference to FIG. 4A, responsive to receiving a notification from vehicular 360-degree threat detection appliance 408 of the detection of threat 410 on the passenger side of police car 404, vehicular 360-degree threat detection appliance 406 may determine that threat 410 is positioned on the driver side of police car 402.

In some embodiments, in addition, or as an alternative, to indicating a relative direction of a detected threat, an audible and/or visual notification may indicate an identifier of a party who the notification is intended for. As a first example, with reference to FIG. 4A, threat 410 may pose a greater danger to the occupants of police car 404 than to the occupants of police car 402. Thus, the electronic computing device 200 may generate an audible notification of threat 410 within police car 402 identifying police car 404 (for example, a unit number associated with police car 404), one or more occupants of police car 404 (for example, a name of an occupant of police car 404), or both. As a second example, with reference to FIG. 4C, threat 410 may pose a greater danger to the occupants of police car 402 than the occupants of police car 404. Thus, the electronic computing device 200 may generate a visual notification of threat 410 within police car 402 identifying police car 402 (for example, a unit number associated with police car 402), one or more occupants of police car 402 (for example, a name of an occupant of police car 402), or both.

In some embodiments, in addition, or as an alternative, to indicating a relative direction of a detected threat, an audible and/or visual notification may indicate whether the threat is visible or obstructed. For example, with reference to FIG. 4A, threat 410 may not be visible to the occupants of police car 402. Thus, the electronic computing device 200 may generate an audible notification to the occupants of police car 404 of "THREAT AT 3 O'CLOCK!" and further generate an audible notification to the occupants of police car 402 of "OBSTRUCTED THREAT AT 9 O'CLOCK!"

In some embodiments, in addition, or as an alternative, to indicating a relative direction of a detected threat, an audible and/or visual notification may indicate an instruction to take an evasive action. For example, with reference to FIG. 4A, threat 410 is pointing a weapon at the passenger side of police car 404. Thus, the electronic computing device 200 may generate an audible notification to the occupants of police car 404 of "DUCK! THREAT AT 3 O'CLOCK!"

In some situations, two vehicles may be positioned adjacent each other such that an audible notification of a threat generated by a target electronic device in one vehicle may be overheard by an occupant in the other vehicle. Thus, in some embodiments, upon detecting that the target electronic devices of two vehicles are positioned close enough to each other such that their audible notifications may be overheard by the occupants of both vehicles, the electronic computing device 200 lowers the volume level of the audible notifications so that each occupant only hears audible notifications generated by the target electronic devices in their vehicle. For example, with reference to FIG. 4A, the personal radio of an officer sitting in police car 402 may be positioned close enough to an officer sitting in police car 404 such that the officer sitting in police car 404 may hear both an audible notification of "THREAT AT 3 O'CLOCK!" generated by their own personal radio and an audible notification of "THREAT AT 6 O'CLOCK" generated by the personal radio of the officer sitting in police car 402. Thus, the electronic computing device 200 may cause the personal radios of the officers in police cars 402 and 404 to each generate an audible notification of threat 410 with a lower volume level so that each officer can only hear the audible notification generated by their own personal radio. In some embodiments, the electronic computing device 200 detects that that target electronic devices of the first and second vehicles are positioned close enough to each other such that their audible notifications may be overheard by the occupants of both vehicles based on one target electronic device detecting audio generated by another target electronic device. For example, the personal radio of an officer sitting in the first vehicle may detect audio generated by the personal radio of an officer sitting in the second vehicle. Alternatively or in addition, the electronic computing device 200 detects that that target electronic devices of the first and second vehicles are positioned close enough to each other such that their audible notifications may be overheard by the occupants of both vehicles based on the location of the first vehicle and the location of the second vehicle.

c. Reciprocal Threat Detection Coverage

In addition to receiving threat detection coverage from the second vehicular 360-degree threat detection appliance, the first vehicular 360-degree threat detection appliance may also provide threat detection coverage for the second vehicle. In some embodiments, the electronic computing device 200 may detect a threat within a sub-portion of the remaining portions of the first vehicular threat 360-degree detection appliance that has a field-of-view other than the obstructed field-of-view. For example, with reference to FIG. 4A, the portion of vehicular 360-degree threat detection appliance 406 that has an obstructed field-of-view (i.e., the distancing sensor that senses past the driver side of police car 402) may be disabled while vehicular 360-degree threat detection appliance 408 of police car 404 provides threat detection coverage for police car 402 with the field-of-view of the disabled distancing sensor. While the above-noted distancing sensor is disabled, the remaining portions of vehicular 360-degree threat detection appliance 406 (i.e., the other three distancing sensors) may continue to monitor for threats in a field-of-view other than the obstructed field-of-view. A portion of vehicular 360-degree threat detection appliance 408 of police car 404 is obstructed by police car 402 (i.e., the distancing sensor that senses past the driver side of police car 404). Thus, vehicular 360-degree threat detection appliance 406 may provide threat detection to vehicular 360-degree threat detection appliance 408 with the distancing sensor that senses past the passenger side of police car 402. Responsive to detecting a threat with the distancing sensor that senses past the passenger side of police car 402, vehicular 360-degree threat detection appliance 406 may transmit a notice indicative of the threat to vehicular 360-degree threat detection appliance 408.

In some embodiments, the sub-portion of the first vehicular 360-degree threat detection appliance that provides threat coverage to the second vehicle is the portion having a field-of-view opposite the obstructed field-of-view, such as in the above-described example. Alternatively or in addition, the second vehicular 360-degree threat detection appliance provides an indication of the sub-portion of the first vehicular 360-degree threat detection appliance that the second 360-degree threat detection appliance wants threat coverage from. In some embodiments, the electronic computing device 200 receives (for example, via the transceiver 208) a request from the second vehicular 360-degree threat detection appliance for the first vehicular 360-degree threat detection appliance to provide threat detection coverage for the second vehicle. This request (an example of a "second request") may be similar to the request described in detail above in relation to block 306 of FIG. 3. For example, this request may include an absolute bearing direction or bearing range identifying the field-of-view of the sub-portion of the first vehicular 360-degree threat detection appliance that the second vehicular 360-degree threat detection appliance is requesting the first vehicular 360-degree threat detection appliance to provide threat detection over. In some embodiments, responsive to receiving the request, the electronic computing device 200 identifies one or more distancing sensors of the first vehicular 360-degree threat detection appliance that has the requested the field-of-view based on the orientation of the first vehicle and the absolute bearing direction or bearing range specified in the request. Examples of methods for determining the orientation of the first vehicle have been previously-described herein.

d. Collaborating Between Two Adjacently-Parked Vehicles

Figure 5:
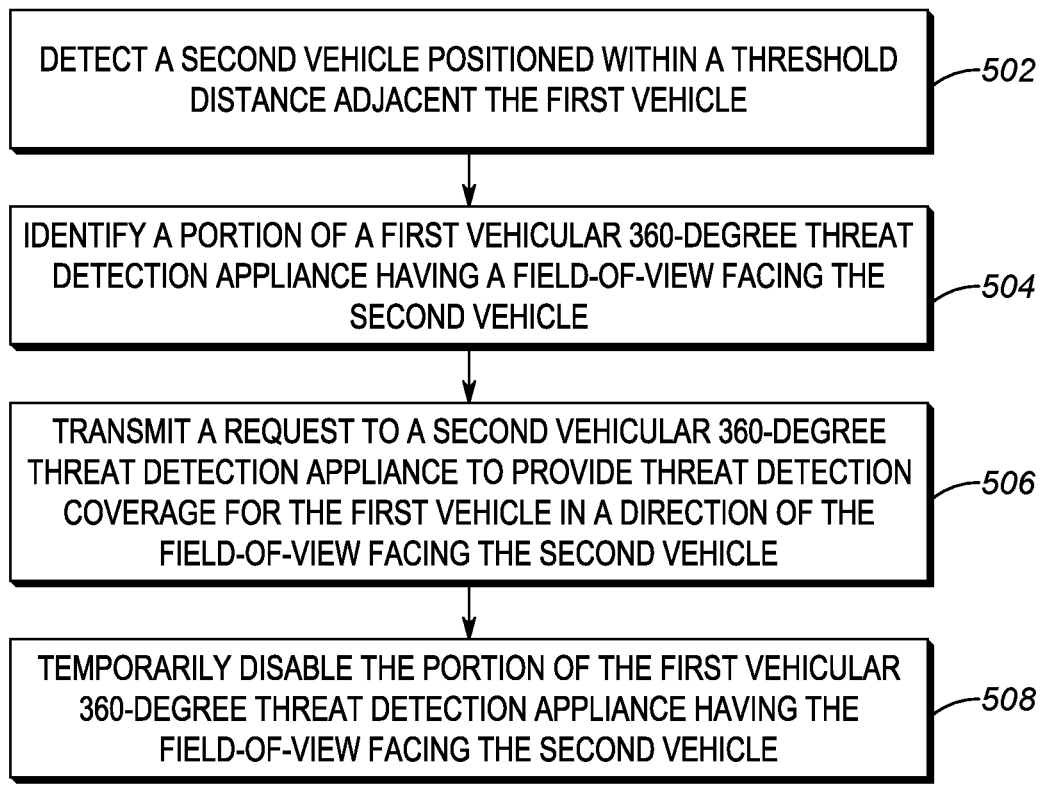
FIG. 5 illustrates a flow chart of a method for collaborating between vehicular 360-degree threat detection appliances of adjacently-parked vehicles, in accordance with some embodiments.

Turning now to FIG. 5, a further embodiment is described for those instances in which two vehicles are adjacently-parked (for example, in a side-by-side configuration, a front-to-back configuration, and a back-to-front configuration). A flow chart diagram in FIG. 5 illustrates a process 500 for collaborating between vehicular threat detection appliances of adjacently-parked vehicles. FIGS. 4A and 4B set forth perspective views illustrating various blocks of process 500 in example scenarios. While a particular order of processing blocks, message receptions, and/or message transmissions is indicated in FIG. 5 for exemplary purposes, timing and ordering of such blocks, receptions, and transmissions may vary where appropriate without negating the purpose and advantages of the examples set forth in detail throughout the remainder of this disclosure. A corresponding electronic computing device, such as the vehicular computing device 108 of FIG. 1 and/or the electronic computing device 200 of FIG. 2, and embodied as a singular electronic computing device or distributed electronic computing device making up an electronic processing system as set forth earlier, may execute process 500. For ease of description, the process 500 is described below as being substantially performed by the electronic computing device 200 illustrated in FIG. 2.

The process 500 begins at block 502 where the electronic computing device 200 detects (for example, with the electronic processor 213) a second vehicle positioned within a threshold distance adjacent a first vehicle. A first vehicular 360-degree threat detection appliance is physically coupled to the first vehicle. A second vehicular 360-degree threat detection appliance is physically coupled to the second vehicle. The threshold distance is the distance in which the second vehicle is positioned close enough to the first vehicle such that a portion of the first vehicular 360-degree threat detection appliances is obstructed by the second vehicle, and a portion of the second vehicular 360-degree threat detection appliance is obstructed by the first vehicle. For example, when positioned within about 9 to 18 feet from the first vehicle, the second vehicle may obstruct all or a portion of the first vehicular 360-degree threat detection appliance physically attached to the first vehicle. This obstruction may be caused by the body of the second vehicle, interference caused by one or more distancing sensors included in the second vehicular 360-degree threat detection appliance, or both.

The transmission range of an ultra-wide-band transceiver is approximately 10 meters. Thus, in some embodiments, the electronic computing device 200 is configured to detect that the second vehicle is positioned within a threshold distance adjacent the first vehicle by detecting the presence of an ultra-wide-band transceiver of the second vehicle. For example, an ultra-wide-band transceiver (an example of a "second ultra-wide-band transceiver"), which is communicably coupled to the electronic computing device 200, may detect an ultra-wide-band transceiver (an example of a "third ultra-wide-band transceiver") of the second vehicle.

Alternatively or in addition, the electronic computing device 200 is configured to detect that the second vehicle is positioned within a threshold distance adjacent the first vehicle based on the locations of the first and second vehicles. For example, the electronic computing device 200 may include a global positioning system (GPS) receiver (and/or other location determination device) configured to determine a first GPS position of the vehicle 102. The electronic computing device 200 may receive (for example, via the transceiver 208) a second GPS location of the second vehicle and compare the first and second GPS locations to detect that the second vehicle (along with the second vehicular 360-degree threat detection apparatus) is positioned within the threshold distance adjacent the first vehicle.

Next, at block 504, the electronic computing device 200 identifies (for example, with the electronic processor 213) a portion of the first vehicular 360-degree threat detection appliance having a field-of-view facing the second vehicle. In some embodiments, the electronic computing device 200 also identifies (or is notified thereof by the second vehicular 360-degree threat detection appliance) a portion of the second vehicular 360-degree threat detection appliance having a field-of-view facing the first vehicle. In some embodiments in which the first vehicular 360-degree threat detection appliance includes a plurality of distancing sensors, the electronic computing device 200 identifies the portion of the first vehicular 360-degree threat detection appliance having a field-of-view facing the second vehicle by identifying one or more distancing sensors of the plurality of distancing sensors that face the second vehicle. The electronic computing device 200 may identify the one or more distancing sensors based on the location of the first vehicle, the location of the second vehicle, and the orientation of the first vehicle. For example, with reference to FIG. 4A, the electronic computing device 200 determine identify the distancing sensor of vehicular 360-degree threat detection appliance 406 that senses past the driver side of police car 402 as being a sensor that faces police car 404 based on the location of police car 402, the location of police car 404, and the orientation of the police car 402. Alternatively or in addition, in some embodiments in which the first vehicular 360-degree threat detection appliance includes a singular distancing sensor (for example, a rotating radar sensor or a dome imaging sensor), the electronic computing device 200 identifies the portion of the first vehicular 360-degree threat detection appliance having a field-of-view facing the second vehicle by identifying a sub-portion of the singular distancing sensor that faces the second vehicle based on the location of the first vehicle, the location of the second vehicle, and the orientation of the first vehicle.

Next, at block 506, the electronic computing device 200 transmits (for example, via the transceiver 208) a request to the second vehicular 360-degree threat detection appliance to provide coverage for the first vehicle in a direction of the field-of-view facing the second vehicle. This request may be the same or similar to the request described in detail above in relation to block 306 of FIG. 3. For example, the request may include information indicating a field-of-view. In alternate embodiments, the request may include the detection that the second vehicle is positioned within a threshold distance adjacent the first vehicle as described above in relation to block 502.

Finally, at block 508, the electronic computing device 200 temporarily disables (for example, with the electronic processor 213) the portion of the first vehicular 360-degree threat detection appliance having a field-of-view facing the second vehicle. In some embodiments, the electronic computing device 200 also temporarily disables (or instructs the second vehicular 360-degree threat detection appliance to disable) the portion of the second vehicular 360-degree threat detection appliance having a field-of-view facing the first vehicle. In some embodiments in which the first vehicular 360-degree threat detection appliance includes a plurality of distancing sensors, the electronic computing device 200 disables the portion of the first vehicular 360-degree threat detection appliance having a field-of-view facing the second vehicle by disabling one or more distancing sensors of the plurality of distancing sensors that face the second vehicle. As a first example, with reference to FIG. 4A, the electronic computing device 200 may temporarily disable the distancing sensor of vehicular 360-degree threat detection appliance 406 that senses past the driver side of police car 402 responsive to determining that police car 404 is positioned adjacent the driver side of police car 402. As a second example, with reference to FIG. 4B, the electronic computing device 200 may temporarily disable the distancing sensor of vehicular 360-degree threat detection appliance 406 that senses past the rear side of police car 402 responsive to determining that police car 404 is positioned adjacent the rear side of police car 402. Alternatively or in addition, in some embodiments in which the first vehicular 360-degree threat detection appliance includes a singular distancing sensors (for example, a rotating radar sensor or a dome imaging sensor), the electronic computing device 200 disables the portion of the first vehicular 360-degree threat detection appliance having a field-of-view facing the second vehicle by disabling a sub-portion of the singular distancing sensor that faces the second vehicle. For example, the electronic computing device 200 may disable the transmitter and the receiver of a rotating radar sensor when the rotating radar sensor is positioned with a field-of-view that faces the second vehicle. Alternatively or in addition, the electronic computing device 200 may disable processing of a sub-portion of the singular distancing sensor that faces the second vehicle. For example, the electronic computing device 200 may disable processing of image data captured within a portion of an imaging sensor that faces the second vehicle, while continuing to process image data captured within other portions of the imaging sensor that do not face the second vehicle (i.e., portions that may not be obstructed).

In some embodiments, the electronic computing device 200 re-enables the portion of the first vehicular 360-degree threat detection appliance having the field-of-view facing the second vehicle upon detecting that the second vehicle has moved to a position that is no longer within the threshold distance adjacent the first vehicle. In some embodiments, the electronic computing device 200 also re-enables the portion of the second vehicular 360-degree threat detection appliance having a field-of-view facing the first vehicle upon detecting that the second vehicle has moved to a position that is no longer within the threshold distance adjacent the first vehicle.

e. Collaborating Between More than Two Vehicles

While the above-described embodiments focus on collaborating between the vehicular 360-degree threat detection appliances of two vehicles, the above-described systems and methods may also be used for collaborating between vehicular 360-degree threat detection appliances of three or more vehicles parked in a serial or parallel configuration, or a mixture thereof. As a first example, a vehicular 360-degree threat detection appliance may provide threat detection coverage to two other vehicular 360-degree threat detection appliances with obstructed field-of-views. As a second example, four vehicular 360-degree threat detection appliances may communicate with each other to generate a merged geofence detection perimeter. As a third example, a vehicular 360-degree threat detection appliance may act as a relay between two other vehicular 360-degree threat detection appliances that cannot communicate directly with each other.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order or number of occurrences between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. The term "one of", without a more limiting modifier such as "only one of", and when applied herein to two or more subsequently defined options such as "one of A and B" should be construed to mean an existence of any one of the options in the list alone (for example, A alone or B alone) or any combination of two or more of the options in the list (for example, A and B together).

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electronic processing system for collaborating between vehicular threat detection appliances of adjacently-parked vehicles, the system comprising:
   a memory;
   a transceiver;
   a first vehicular 360-degree threat detection appliance physically coupled to a first vehicle, including a communicatively coupled set of one or more distancing sensors; and
   an electronic processor configured to:
      identify a portion of the first vehicular 360-degree threat detection appliance having an obstructed field-of-view,
      detect a second vehicular 360-degree threat detection appliance physically coupled to a second vehicle parked adjacent the first vehicle and having an unobstructed field-of-view of the obstructed field-of-view,
      transmit, via the transceiver, a request to the second vehicular 360-degree threat detection appliance to provide threat detection coverage for the first vehicle in a direction of the obstructed field-of-view, and
      temporarily disable the portion of the first vehicular 360-degree threat detection appliance having the obstructed field-of-view comprising one or more of (i) when the one or more distancing sensors include two or more distancing sensors, temporarily disabling at least one of the set of two or more distancing sensors corresponding to the obstructed field-of-view, (ii) when the one or more distancing sensors include a rotating distancing sensor, temporarily disabling at least a field-of-view during a rotation portion corresponding to the obstructed field-of-view, and (iii) when post processing disabling is used, temporarily disabling processing of image data corresponding to the obstructed field-of-view.

2. The electronic processing system of claim 1, wherein the electronic processor is further configured to:
   detect, with the first vehicular 360-degree threat detection appliance, a threat within a sub-portion of the remaining portions of the first vehicular threat 360-degree detection appliance, the sub-portion having a first field-of-view other than the obstructed field-of-view, and
   responsively transmit, via the transceiver, a notice indicative of the threat to the second vehicular 360-degree threat detection appliance.

3. The electronic processing system of claim 2, wherein the electronic processor is further configured to:
   receive, via the transceiver, a second request from the second vehicular 360-degree threat detection appliance to provide threat detection coverage for the second vehicle, the second request including an absolute bearing direction or bearing range identifying the first field-of-view of the sub-portion that the second vehicular 360-degree threat detection appliance is requesting the first vehicular 360-degree threat detection appliance provide threat detection over,
   identify one or more distancing sensors of the first vehicular 360-degree threat detection appliance facing the first field-of-view based on an orientation of the first vehicle and the absolute bearing direction or bearing range, and
   detect the threat within the sub-portion of the remaining portions of the first vehicular 360-degree threat detection appliance with the one or more distancing sensors of the first vehicular 360-degree threat detection appliance facing the first field-of-view.

4. The electronic processing system of claim 3, wherein the electronic processor is further configured to determine the orientation of the first vehicle by at least one selected from a group consisting of
   determining the orientation of the first vehicle based on an orientation indication received from a magnetometer physically coupled to the first vehicle and communicably coupled to the electronic processing system,
   determining the orientation of the first vehicle based on a plurality of global positioning system locations of the first vehicle before the first vehicle comes to a stop,
   determining the orientation of the first vehicle by detecting a surface of the second vehicle based on ranging data determined by the first vehicular 360-degree threat detection appliance, and determining the orientation of the first vehicle based on video analytics of image data captured by the first vehicular 360-degree threat detection appliance.

5. The electronic processing system of claim 1, wherein the electronic processor is further configured to:
receive, via the transceiver, a notification from the second vehicular 360-degree threat detection appliance indicating a threat and a location of the threat,
determine a direction of the threat relative to the first vehicle based on a location of the first vehicle, an orientation of the first vehicle, and the location of the threat, and
generate, via a user interface, an audible notification or a visual notification indicating the threat and the direction of the threat relative to the first vehicle.

6. The electronic processing system of claim 1, wherein the electronic processor is further configured to:
receive, via the transceiver, a notification from the second vehicular 360-degree threat detection appliance indicating a threat and a first direction of the threat relative to the second vehicle,
determine a second direction of the threat relative to the first vehicle based on a location of the first vehicle, a location of the second vehicle, an orientation of the first vehicle, an orientation of the second vehicle, and the first direction of the threat relative to the first vehicle, wherein the second direction is different than the first direction, and
generate, via a user interface, an audible notification or a visual notification indicating the threat and the second direction of the threat relative to the first vehicle.

7. The electronic processing system of claim 1, wherein the electronic processor is further configured to:
receive, via the transceiver, a notification from the second vehicular 360-degree threat detection appliance indicating a threat and an identifier indicating whether the threat is to the first vehicle or the second vehicle, and
generate, via a user interface, an audible notification or a visual notification of the threat and the identifier.

8. The electronic processing system of claim 1, wherein the electronic processor is further configured to:
detect a threat with the first vehicular 360-degree threat detection appliance, and
identify one or more target electronic devices to notify of the threat based on a location of the threat and at least one selected from a first group consisting of a location of the first vehicle, a location of the second vehicle, an orientation of the first vehicle, and an orientation of the second vehicle,
wherein the one or more target electronic device including at least one selected from a second group consisting of an electronic device associated with an occupant of the first vehicle, an electronic device associated with an occupant of the second vehicle, an electronic device fixed to the first vehicle, and an electronic device fixed to the second vehicle.

9. The electronic processing system of claim 1, wherein the first vehicular 360-degree threat detection appliance includes a radio wave distancing system, and wherein temporarily disabling the portion of the first vehicular 360-degree threat detection appliance includes temporarily disabling a portion of the radio wave distancing system.

10. The electronic processing system of claim 9, wherein the first vehicular 360-degree threat detection appliance further includes a light imaging distancing system, and wherein the electronic processor is further configured to monitor, via portions of the light imaging distancing system, for an indication that the obstructed field-of-view is no longer obstructed.

11. The electronic processing system of claim 1, wherein the first vehicular 360-degree threat detection appliance includes a light imaging distancing system, and wherein temporarily disabling the portion of the first vehicular 360-degree threat detection appliance includes temporarily disabling a portion of the light imaging distancing system.

12. A method for collaborating between vehicular 360-degree threat detection appliances of adjacently-parked vehicles, the method comprising:
identifying, with an electronic processor, a portion of a first vehicular 360-degree threat detection appliance physically coupled to a first vehicle, including a communicatively coupled set of one or more distancing sensors and having an obstructed field-of-view;
detecting, with the electronic processor, a second vehicular 360-degree threat detection appliance physically coupled to a second vehicle parked adjacent the first vehicle and having an unobstructed field-of-view of the obstructed field-of-view;
transmitting, via a transceiver communicably coupled to the electronic processor, a request to the second vehicular 360-degree threat detection appliance to provide threat detection coverage for the first vehicle in a direction of the obstructed field-of-view; and
temporarily disabling, via the electronic processor, the portion of the first vehicular 360-degree threat detection appliance having the obstructed field-of-view comprising one or more of (i) when the one or more distancing sensors include two or more distancing sensors, temporarily disabling at least one of the set of two or more distancing sensors corresponding to the obstructed field-of-view, (ii) when the one or more distancing sensors include a rotating distancing sensor, temporarily disabling at least a field-of-view during a rotation portion corresponding to the obstructed field-of-view, and (iii) when post processing disabling is used, temporarily disabling processing of image data corresponding to the obstructed field-of-view.

13. An electronic processing system for collaborating between vehicular 360-degree threat detection appliances of adjacently-parked vehicles, the system comprising:
a memory;
a transceiver;
a first vehicular 360-degree threat detection appliance physically coupled to a first vehicle, including a communicatively coupled set of one or more distancing sensors; and
an electronic processor configured to:
detect a second vehicle positioned within a threshold distance adjacent the first vehicle, wherein a second vehicular 360-degree threat detection appliance is physically coupled to the second vehicle,
identify a portion of the first vehicular 360-degree threat detection appliance having a field-of-view facing the second vehicle,
transmit, via the transceiver, a request to the second vehicular 360-degree threat detection appliance to provide threat detection coverage for the first vehicle in a direction of the field-of-view facing the second vehicle, and
temporarily disable the portion of the first vehicular 360-degree threat detection appliance having the field-of-view facing the second vehicle comprising one or more of (i) when the one or more distancing sensors include two or more distancing sensors, temporarily disable at least one of the set of two or more distancing sensors corresponding to the field-of-view facing the second vehicle, (ii) when the one or more distancing sensors include a rotating distancing sensor, temporarily disable at least a field-of-view during a rotation portion corresponding to the field-of-view facing the second vehicle, and (iii) when post processing disabling is used, temporarily disabling processing of image data corresponding to the field-of-view facing the second vehicle.

14. The electronic processing system of claim 13, wherein the first 360-degree vehicular threat detection appliance including a plurality of distancing sensors, wherein the electronic processor is further configured to identify the portion of the first vehicular 360-degree threat detection appliance having the field-of-view facing the second vehicle by identifying one or more distancing sensors of the plurality of distancing sensors that face the second vehicle based on a location of the first vehicle, a location of the second vehicle, and an orientation of the first vehicle, and wherein the electronic processor is further configured to temporarily disable the portion of the first vehicular 360-degree threat detection appliance having the field-of-view facing the second vehicle by disabling the one or more distancing sensors.

15. The electronic processing system of claim 13, wherein the first vehicular 360-degree threat detection appliance includes a singular distancing sensor, wherein the electronic processor is further configured to identify the portion of the first vehicular 360-degree threat detection appliance having the field-of-view facing the second vehicle by identifying a sub-portion of the singular distancing sensor facing the second vehicle based on a location of the first vehicle, a location of the second vehicle, and an orientation of the first vehicle, and wherein the electronic processor is further configured to temporarily disable the portion of the first vehicular 360-degree threat detection appliance having the field-of-view facing the second vehicle by at least one selected from a group consisting of:
  disabling the sub-portion of the singular distancing sensor, and
  disabling processing of the sub-portion of the singular distancing sensor for detecting threats within the field-of-view facing the second vehicle.

16. The electronic processing system of claim 13, wherein the first vehicular 360-degree threat detection appliance includes:
  a first distancing sensor configured to sense past a driver side of the first vehicle, and
  a second distancing sensor configured to sense past a passenger side of the first vehicle, and
wherein the electronic processor is further configured to:
  temporarily disable the first distancing sensor responsive to determining that the second vehicle is positioned adjacent the driver side of the first vehicle, and
  temporarily disable the second distancing sensor responsive to determining that the second vehicle is positioned adjacent the passenger side of the first vehicle.

17. The electronic processing system of claim 16, wherein the first vehicular 360-degree threat detection appliance further includes:
  a third distancing sensor configured to sense past a front side of the first vehicle, and
  a fourth distancing sensor configured to sense past a rear side of the first vehicle, and
wherein the electronic processor is further configured to:
  temporarily disable the third distancing sensor responsive to determining that second vehicle is positioned adjacent the front side of the first vehicle, and
  temporarily disable the fourth distancing sensor responsive to determining that the second vehicle is positioned adjacent the rear side of the first vehicle.

18. The electronic processing system of claim 13, wherein the electronic processor is further configured to detect that the second vehicle is positioned within a threshold distance adjacent the first vehicle includes one of the transceiver that is an ultra-wide-band transceiver and a second ultra-wide-band transceiver, the one of the transceiver and the second ultra-wide-band transceiver configured to detect a third ultra-wide-band transceiver associated with the second vehicular 360-degree threat detection appliance.

19. The electronic processing system of claim 13, wherein the electronic processor is further configured to detect that the second vehicle is positioned within the threshold distance adjacent the first vehicle by:
  accessing a global positioning system location of the first vehicle,
  receiving, via the transceiver, a global positioning system location of the second vehicle, and
  comparing the global positioning system location of the first vehicle and the global positioning system location of the second vehicle.

20. The electronic processing system of claim 13, wherein the electronic processor is further configured to:
  detect that the second vehicle has moved to a position no longer within the threshold distance adjacent the first vehicle, and
  responsively re-enable the portion of the first vehicular 360-degree threat detection appliance that was disabled.

* * * * *